(12) United States Patent  
Hu et al.

(10) Patent No.: US 12,507,008 B2
(45) Date of Patent: Dec. 23, 2025

(54) BLUETOOTH LINE-IN STEREO

(71) Applicant: Sonos, Inc., Santa Barbara, CA (US)

(72) Inventors: Zijian Ken Hu, Quincy, MA (US); Meng Wang, Lexington, MA (US)

(73) Assignee: Sonos, Inc., Goleta, CA (US)

( * ) Notice: Subject to any disclaimer, the term of this patent is extended or adjusted under 35 U.S.C. 154(b) by 209 days.

(21) Appl. No.: 18/465,122

(22) Filed: Sep. 11, 2023

(65) Prior Publication Data

US 2024/0089659 A1   Mar. 14, 2024

Related U.S. Application Data

(60) Provisional application No. 63/375,573, filed on Sep. 14, 2022.

(51) Int. Cl.
*H04R 3/12* (2006.01)
*H04R 27/00* (2006.01)

(52) U.S. Cl.
CPC ............... *H04R 3/12* (2013.01); *H04R 27/00* (2013.01)

(58) Field of Classification Search
CPC .... H04R 3/12; H04R 27/00; H04R 2227/005; G06F 3/165
See application file for complete search history.

(56) References Cited

U.S. PATENT DOCUMENTS

| 5,440,644 | A | 8/1995 | Farinelli et al. |
| 5,761,320 | A | 6/1998 | Farinelli et al. |
| 5,923,902 | A | 7/1999 | Inagaki |
| 6,032,202 | A | 2/2000 | Lea et al. |
| 6,256,554 | B1 | 7/2001 | DiLorenzo |
| 6,404,811 | B1 | 6/2002 | Cvetko et al. |
| 6,469,633 | B1 | 10/2002 | Wachter |
| 6,522,886 | B1 | 2/2003 | Youngs et al. |

(Continued)

FOREIGN PATENT DOCUMENTS

| EP | 1389853 A1 | 2/2004 |
| WO | 200153994 | 7/2001 |

(Continued)

OTHER PUBLICATIONS

International Searching Authority, International Search Report and Written Opinion mailed on Feb. 27, 2024, issued in connection with International Application No. PCT/US2023/032521, filed on Sep. 12, 2023, 26 pages.

(Continued)

*Primary Examiner* — Disler Paul
(74) *Attorney, Agent, or Firm* — Akerman LLP

(57) ABSTRACT

Disclosed embodiments include a first playback device operating in a first mode where the first playback device plays first audio received from a second playback device via a WLAN in a groupwise fashion. After connecting to a Bluetooth audio source, the first playback device switches from operating in the first mode to operating in a second mode where the first playback device (i) ceases playing the first audio, (ii) generates second playback timing for second audio received from the Bluetooth audio source, (iii) transmits the second audio content and the second playback timing to the second playback device via Bluetooth, and (iv) plays the second audio in a groupwise fashion with the second playback device based on the second playback timing.

20 Claims, 19 Drawing Sheets

(56) References Cited

U.S. PATENT DOCUMENTS

| | | |
|---|---|---|
| 6,611,537 B1 | 8/2003 | Edens et al. |
| 6,631,410 B1 | 10/2003 | Kowalski et al. |
| 6,757,517 B2 | 6/2004 | Chang |
| 6,778,869 B2 | 8/2004 | Champion |
| 7,130,608 B2 | 10/2006 | Hollstrom et al. |
| 7,130,616 B2 | 10/2006 | Janik |
| 7,143,939 B2 | 12/2006 | Henzerling |
| 7,236,773 B2 | 6/2007 | Thomas |
| 7,295,548 B2 | 11/2007 | Blank et al. |
| 7,391,791 B2 | 6/2008 | Balassanian et al. |
| 7,483,538 B2 | 1/2009 | McCarty et al. |
| 7,571,014 B1 | 8/2009 | Lambourne et al. |
| 7,630,501 B2 | 12/2009 | Blank et al. |
| 7,643,894 B2 | 1/2010 | Braithwaite et al. |
| 7,657,910 B1 | 2/2010 | McAulay et al. |
| 7,853,341 B2 | 12/2010 | McCarty et al. |
| 7,987,294 B2 | 7/2011 | Bryce et al. |
| 8,014,423 B2 | 9/2011 | Thaler et al. |
| 8,045,952 B2 | 10/2011 | Qureshey et al. |
| 8,103,009 B2 | 1/2012 | McCarty et al. |
| 8,234,395 B2 | 7/2012 | Millington |
| 8,483,853 B1 | 7/2013 | Lambourne |
| 8,942,252 B2 | 1/2015 | Balassanian et al. |
| 9,904,508 B1 * | 2/2018 | Drinkwater ............. H04L 65/61 |
| 10,057,700 B2 * | 8/2018 | Proctor, Jr. ...... H04N 21/42203 |
| 10,496,359 B2 * | 12/2019 | Drinkwater ............. H04L 65/60 |
| 12,081,950 B2 * | 9/2024 | Proctor, Jr. .......... H04R 29/007 |
| 2001/0042107 A1 | 11/2001 | Palm |
| 2002/0022453 A1 | 2/2002 | Balog et al. |
| 2002/0026442 A1 | 2/2002 | Lipscomb et al. |
| 2002/0124097 A1 | 9/2002 | Isely et al. |
| 2003/0157951 A1 | 8/2003 | Hasty, Jr. |
| 2004/0024478 A1 | 2/2004 | Hans et al. |
| 2007/0142944 A1 | 6/2007 | Goldberg et al. |
| 2011/0158441 A1 | 6/2011 | Batra |
| 2015/0205805 A1 | 7/2015 | Gossain et al. |
| 2016/0072855 A1 | 3/2016 | Palin et al. |
| 2020/0128617 A1 | 4/2020 | Xian et al. |
| 2022/0248139 A1 | 8/2022 | Yore et al. |

FOREIGN PATENT DOCUMENTS

| | | |
|---|---|---|
| WO | 2003093950 A2 | 11/2003 |
| WO | 2014107469 A2 | 7/2014 |

OTHER PUBLICATIONS

AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
*Sonos, Inc.* v. *D M Holdings* (No. 14-1330-RGA), DI 219, Claim Construction Opinion (Jan. 12, 2017) (24 pages).
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

\* cited by examiner

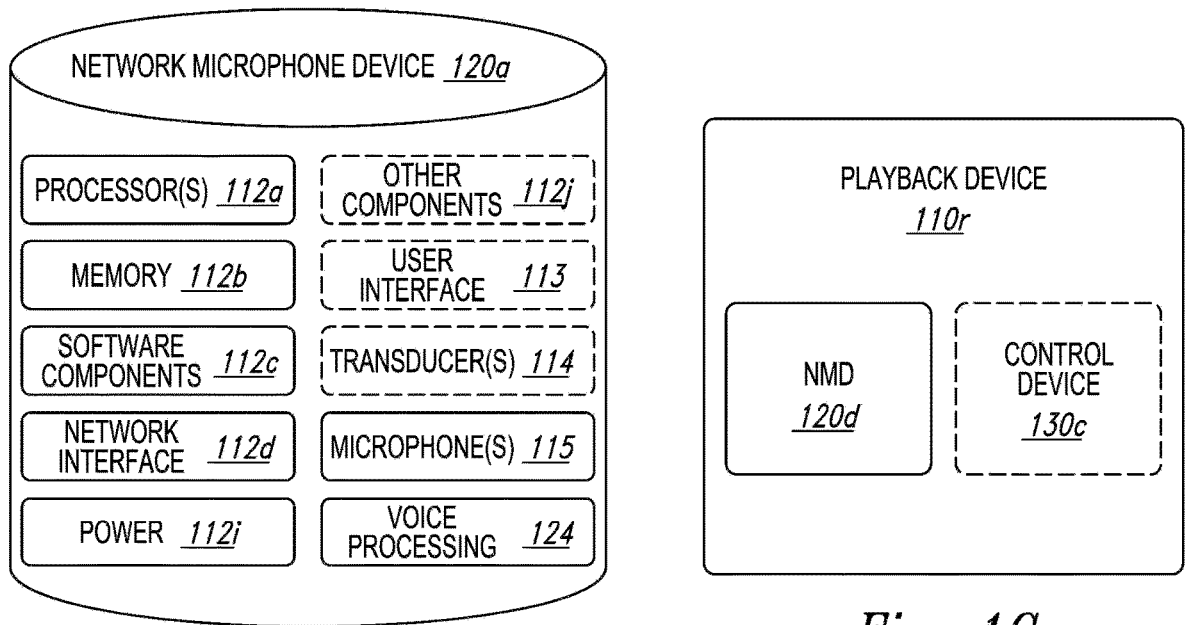
*Fig. 1F*
*Fig. 1G*
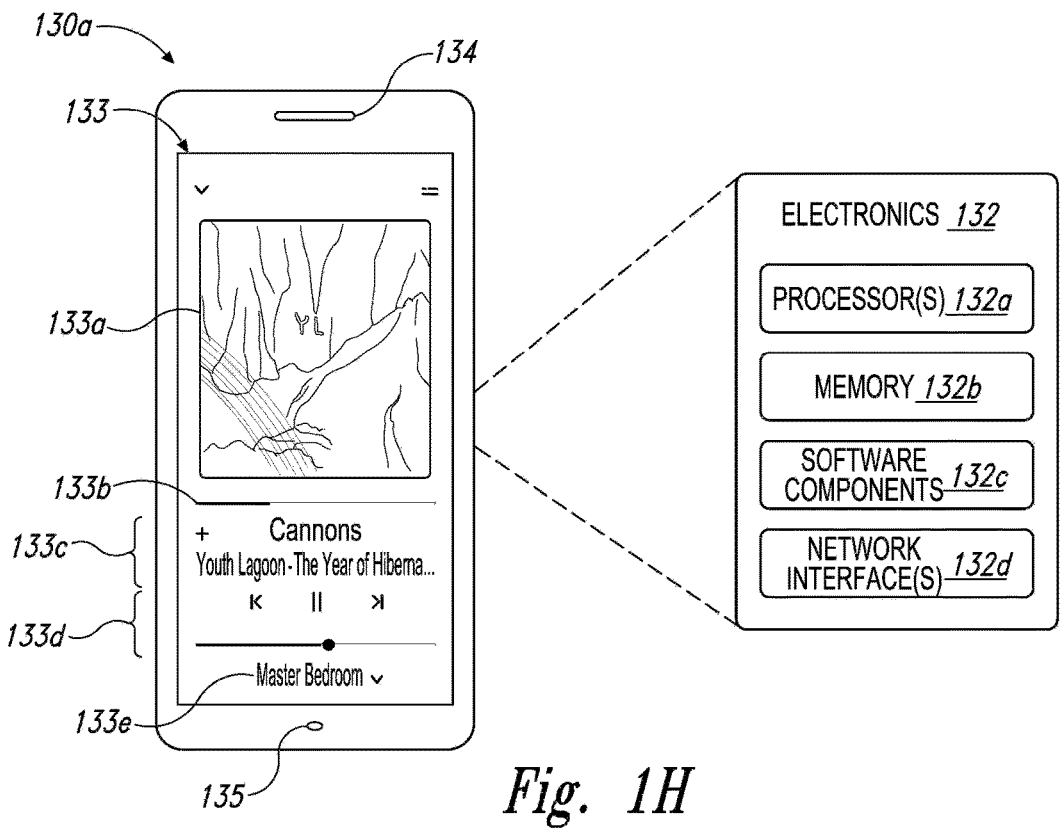
*Fig. 1H*

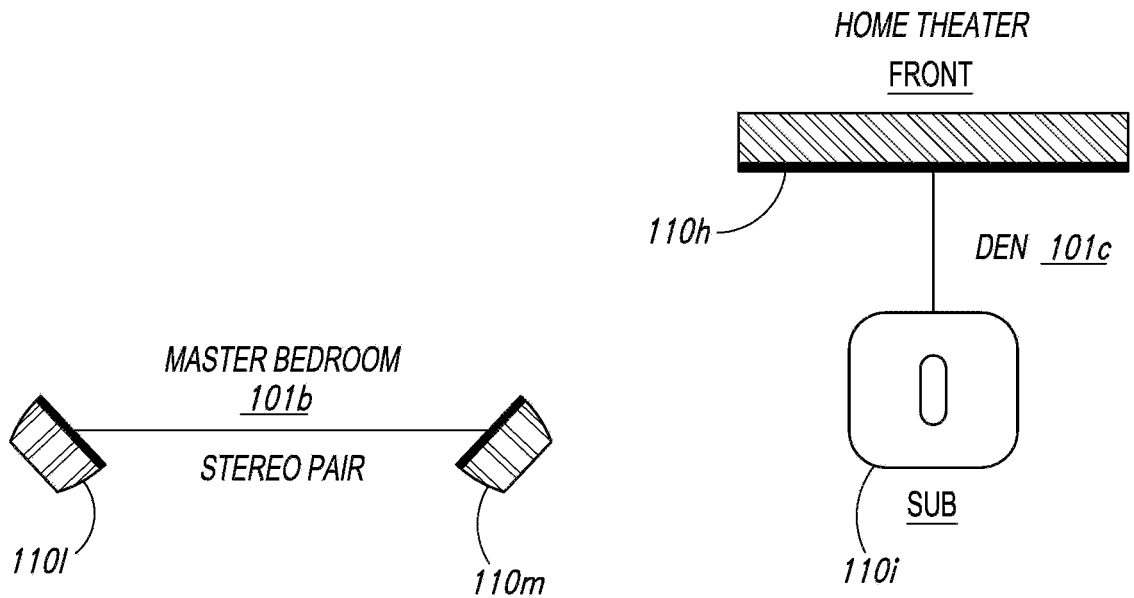
Fig. 1I
Fig. 1J
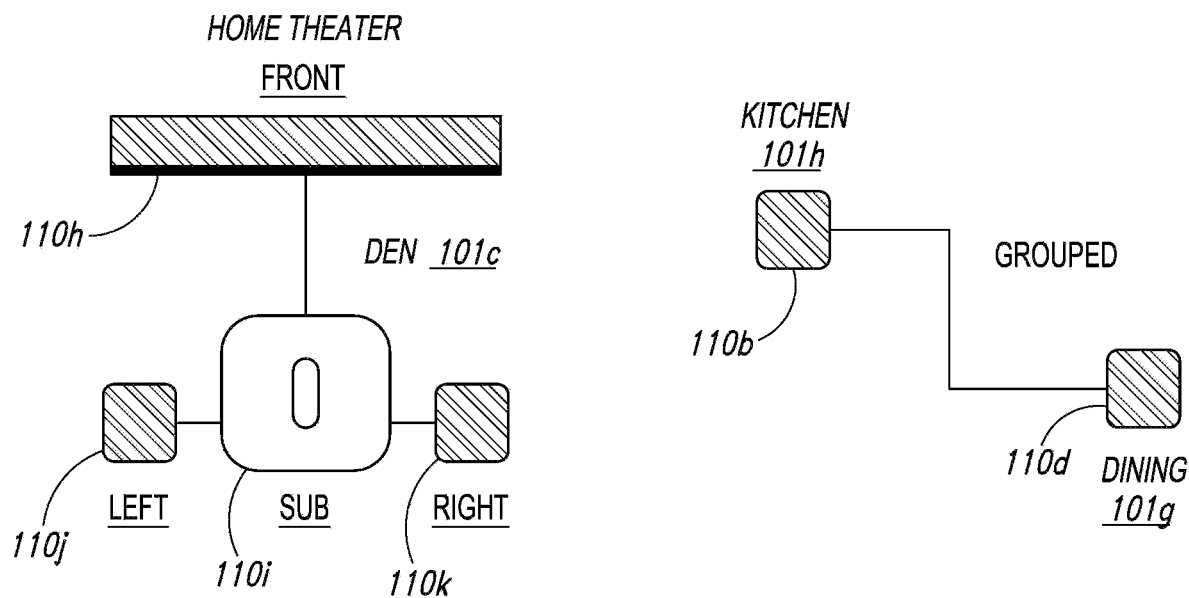
Fig. 1K
Fig. 1L

BLUETOOTH LINE-IN STEREO

CROSS REFERENCE TO RELATED APPLICATIONS

This application claims priority under 35 U.S.C. § 119 to U.S. Provisional App. No. 63/375,573, filed on Sep. 14, 2022, and entitled "Bluetooth Line-In Stereo," the content of which is incorporated herein by reference in its entirety.

FIELD OF THE DISCLOSURE

The present disclosure is related to consumer goods and, more particularly, to methods, systems, products, features, services, and other elements directed to media playback systems, media playback devices, and aspects thereof.

BACKGROUND

Options for accessing and listening to digital audio in an out-loud setting were limited until in 2002, when SONOS, Inc. began development of a new type of playback system. Sonos then filed one of its first patent applications in 2003, titled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), individuals can play most any music they like in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIG. 1F shows a block diagram of a network microphone device.

FIG. 1G shows a block diagram of a playback device.

FIG. 1H shows a partially schematic diagram of a control device.

FIGS. 1-I through 1L show schematic diagrams of corresponding media playback system zones.

Figure 1A:
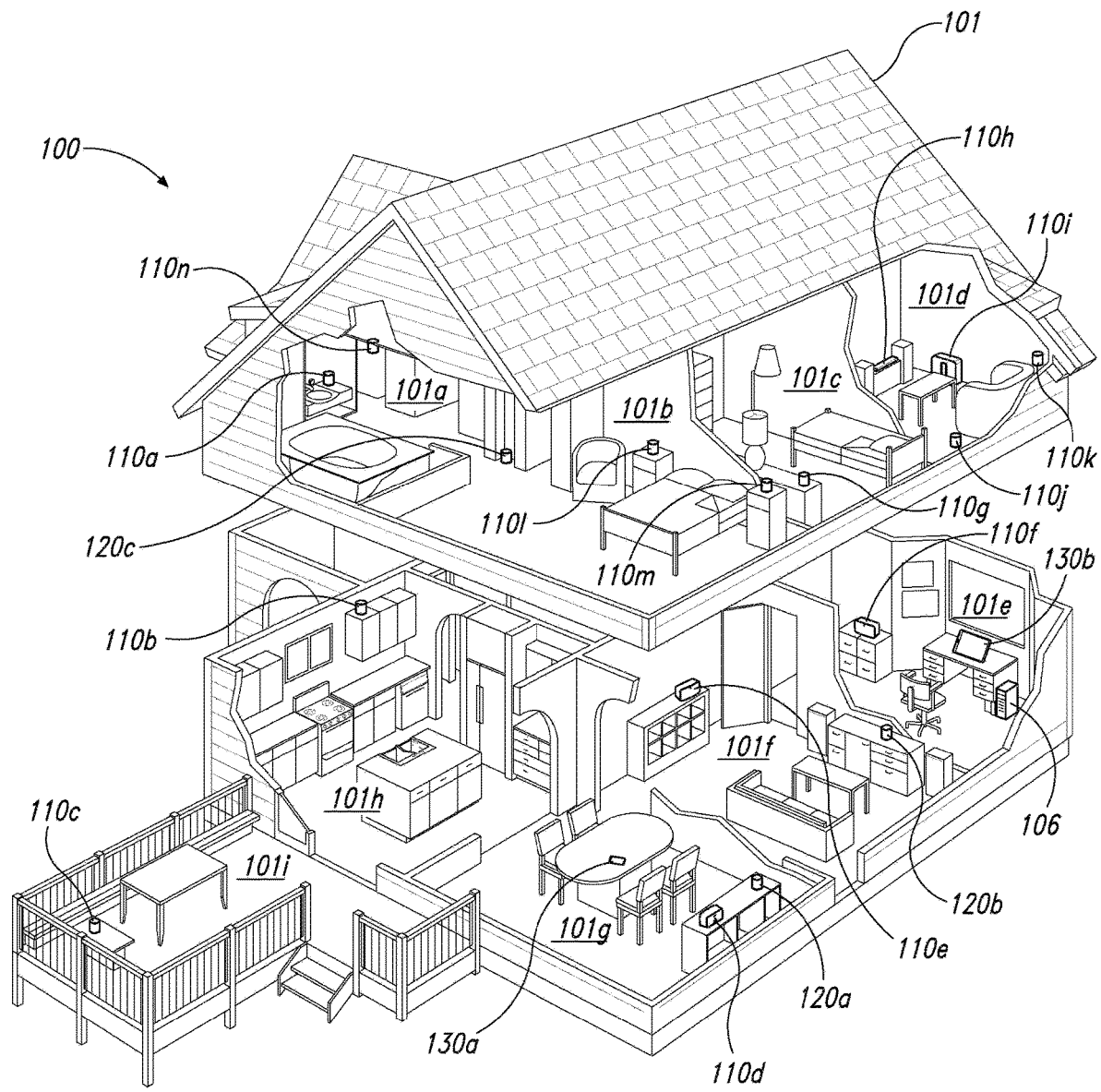
FIG. 1A shows a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Some playback devices include multiple types of network interfaces from which to obtain media content for playback. For example, some types of playback devices include (i) a WiFi interface via which the playback device can obtain media content for playback from media sources that are able to provide media content to the playback device via a Wireless Local Area Network (WLAN) network and (ii) a Bluetooth interface via which the playback device can obtain media content for playback from media sources that are able to provide media content to the playback device via Bluetooth communications. Playback devices with WiFi and Bluetooth capability are sometimes referred to herein as dual-mode playback devices.

Although dual-mode playback devices allow for more connectivity and portability options as compared to WiFi-only or Bluetooth-only playback devices, typical dual-mode playback device often have fewer networking and playback features when playing media content obtained via Bluetooth as compared to the networking and playback options when playing media content obtained via WiFi. Further, dual-mode playback devices introduce technical and operational complexities in connection with switching between receiving media content via WiFi and receiving content via Bluetooth.

For example, stereo pair playback is a desirable audio playback feature implemented by some types of currently-available playback devices. With stereo pair playback, two playback devices (e.g., a first playback device and a second playback device) are configured to play audio in stereo where the first playback device plays one channel of the audio (e.g., the left channel) and the second playback device plays the other channel of the audio (e.g., the right channel). In some implementations, the first playback devices streams audio from an audio source via a WiFi network, and coordinates stereo pair playback with the second playback device via the WiFi network. In some implementations, the first playback device coordinating the stereo pair playback with the second playback device includes the first playback device (i) processing the audio (e.g., the stereo content) obtained from the audio source, (ii) generating playback timing for the processed audio information, and (iii) transmitting one or both channels of the processed audio information and the playback timing to the second playback device. In operation, the first playback device uses the playback timing to play the first channel of the stereo content in synchrony with the second playback device playing the second channel of the stereo content, and the second playback device uses the playback timing to play the second channel of the stereo content in synchrony with the first playback device playing the first channel of the stereo content.

However, for typical playback devices, it is not possible to directly play audio obtained via Bluetooth in a stereo pair playback configuration. Instead, after a Bluetooth audio source (e.g., a smartphone, tablet, laptop, or other Bluetooth audio source) is connected to one of two typical playback devices configured for stereo pair playback, the two playback devices become unpaired from their stereo pair configuration, and only the playback device connected to the Bluetooth audio source plays the audio received from the newly-connected Bluetooth audio source. And rather than playing one channel of the stereo content like the playback device did in the stereo pair playback configuration, the playback device connected to the Bluetooth audio source plays both channels of the stereo content received from the newly-connected Bluetooth audio source.

After connecting the Bluetooth audio source to one of the playback devices in the stereo pair configuration, and thereby causing the two playback devices to become unpaired from their stereo pair configuration, some playback devices enable a user to then manually regroup the two playback devices into a paired configuration. For example, after connecting the first playback device to the Bluetooth audio source, some playback devices are user configurable to enable a user to pair the second playback device with the first playback device, thereby creating a paired Bluetooth configuration comprising the first playback device and the second playback device.

However, in such a paired Bluetooth configuration, typical playback devices cannot play the stereo content received from the Bluetooth audio source in a stereo pair playback configuration in the manner described above, where one playback device plays one channel of the stereo content and the other playback device plays the other channel of the stereo content period. For example, rather than the first playback device playing the first channel of the stereo content and the second playback device playing the second channel of the stereo content like in the above-described stereo pair configuration, the first playback device and the second playback device each play both the first channel and the second channel of the stereo content from the Bluetooth source. Because both playback devices play both channels of the stereo content, the paired Bluetooth configuration is not as desirable as the stereo pair playback configuration where each of the two playback device plays a separate channel of the stereo content.

Embodiments disclosed herein describe systems, devices, and methods for implementing the same type of WiFi stereo pair playback feature with playback devices when receiving stereo content from a Bluetooth audio source, including maintaining the stereo pair configuration when transitioning between WiFi and Bluetooth operation, and transitioning between different Bluetooth configurations.

Playback devices according to some embodiments disclosed herein are configured to operate in several different operating modes. For example, in some embodiments, a first playback device is configured to operate in a first mode where the first playback device is configured to play first audio content received from a first audio source (e.g., a second playback device) via a WLAN in a groupwise fashion with at least the second playback device based on first playback timing associated with the first audio content received from the second playback device via the WLAN. In some embodiments, the first audio content comprises first multichannel audio content (e.g., stereo content), and the first playback device playing the first audio content in a groupwise fashion with at least the second playback device includes the first playback device playing a first channel of the multichannel audio content in synchrony with the second playback device playing the second channel of the multichannel audio content.

After connecting the first playback device to a Bluetooth audio source via a Bluetooth interface, the first playback device switches from operating in the first mode to operating in a second mode where the first playback device is configured to (i) if playing the first audio content, cease playing the first audio content, (ii) generate second playback timing for second audio content received from the Bluetooth audio source, (iii) transmit at least a portion (or perhaps all) of the second audio content and the second playback timing to the second playback device via Bluetooth transmissions, and (iv) play the second audio content in a group wise fashion with the second playback device based on the second playback timing. In some embodiments, playing the second audio content in the groupwise fashion with the second playback device based on second playback timing includes the first playback device playing a first channel of the second audio content in a groupwise fashion with the second playback device based on the second playback timing while the second playback device plays a second channel of the second audio content based on the second playback timing.

In contrast to typical playback devices, connecting the Bluetooth audio source to the first playback device does not cause the first playback device to unpair from the second playback device. Instead, after connecting the Bluetooth audio source to the first playback device, the first playback device and the second playback device remain in the paired configuration they were in before connecting the Bluetooth audio source to the first playback device. So, if the first playback device and the second playback device were in a stereo pair configuration before the Bluetooth audio source was connected to the first playback device, then the first playback device and the second playback device will remain in the stereo pair configuration after the Bluetooth audio device has been connected to the first playback device.

In some embodiments, the paired configuration (i.e., the first playback device paired with the second playback device) may be part of a playback group comprising the first playback device, the second playback device, and one or more additional playback devices. In such embodiments, the paired configuration (i.e., the first playback device and the second playback device) leaves the playback group and becomes a standalone paired configuration after (or perhaps in response to) the Bluetooth audio source connecting to the first playback device.

In some embodiments, while the first playback device is playing the first channel of the second audio content in the groupwise fashion with the second playback device while the second playback device plays the second channel of the second audio content, the first playback device also monitors a status of Bluetooth communications between the first playback device and the second playback device. And if the first playback device determines that it can no longer communicate (or no longer reliably communicate) with the second playback device via Bluetooth after a period of time during which the first playback device was able to reliably communicate with the second playback device via Bluetooth (e.g., because the second playback device has been powered off or moved out of wireless transmission range of the first playback device), then the first playback device is configured to (i) cease transmission of the second audio content and the second playback timing to the second playback device via Bluetooth, and (ii) switch from playing the first channel of the second audio content in a groupwise fashion with the second playback device to instead play both the first channel of the second audio content and the second channel of the second audio content.

Some embodiments also include the first playback device reestablishing the stereo pair configuration with the second playback device after determining that the first playback device can communicate with the second playback device again because, e.g., the second playback device has been powered back on or moved back within wireless transmission range of the first playback device. In such embodiments, after determining that the first playback device can communicate with the second playback device via Bluetooth again following a period of time during which the first playback device could not communicate with the second playback device via Bluetooth, the first playback device (i) resumes Bluetooth transmission of the second audio content and the second playback timing to the first playback device, and (ii) resumes playback of the first channel of the second audio content in the groupwise fashion with the second playback device based on the second playback timing while the second playback device plays the second channel of the second audio content based on the second playback timing.

The above-described embodiments as well as additional and alternative embodiments are described in more detail herein. While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 110a is first introduced and discussed with reference to FIG. 1A. Many of the details, dimensions, angles and other features shown in the Figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110a-n), one or more network microphone devices ("NMDs"), 120 (identified individually as NMDs 120a-c), and one or more control devices 130 (identified individually as control devices 130a and 130b).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the media playback system 100 is configured to play back audio from a first playback device (e.g., the playback device 100a) in synchrony with a second playback device (e.g., the playback device 100b). Interactions between the playback devices 110, NMDs 120, and/or control devices 130 of the media playback system 100 configured in accordance with the various embodiments of the disclosure are described in greater detail below with respect to FIGS. 1B-1L.

In the illustrated embodiment of FIG. 1A, the environment 101 comprises a household having several rooms, spaces, and/or playback zones, including (clockwise from upper left) a master bathroom 101a, a master bedroom 101b, a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in FIG. 1A. Each zone may be given a name according to a different room or space such as the office 101e, master bathroom 101a, master bedroom 101b, the second bedroom 101c, kitchen 101h, dining room 101g, living room 101f, and/or the patio 101i. In some aspects, a single playback zone may include multiple rooms or spaces. In certain aspects, a single room or space may include multiple playback zones.

In the illustrated embodiment of FIG. 1A, the master bathroom 101a, the second bedroom 101c, the office 101e, the living room 101f, the dining room 101g, the kitchen 101h, and the outdoor patio 101i each include one playback device 110, and the master bedroom 101b and the den 101d include a plurality of playback devices 110. In the master bedroom 101b, the playback devices 110l and 110m may be configured, for example, to play back audio content in synchrony as individual ones of playback devices 110, as a bonded playback zone, as a consolidated playback device, and/or any combination thereof. Similarly, in the den 101d, the playback devices 110h-j can be configured, for instance, to play back audio content in synchrony as individual ones of playback devices 110, as one or more bonded playback devices, and/or as one or more consolidated playback devices. Additional details regarding bonded and consolidated playback devices are described below with respect to, for example, FIGS. 1B and 1E and 1I-1M.

In some aspects, one or more of the playback zones in the environment 101 may each be playing different audio content. For instance, a user may be grilling on the patio 101i and listening to hip hop music being played by the playback device 110c while another user is preparing food in the kitchen 101h and listening to classical music played by the playback device 110b. In another example, a playback zone may play the same audio content in synchrony with another playback zone. For instance, the user may be in the office 101e listening to the playback device 110f playing back the same hip hop music being played back by playback device 110c on the patio 101i. In some aspects, the playback devices 110c and 110f play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
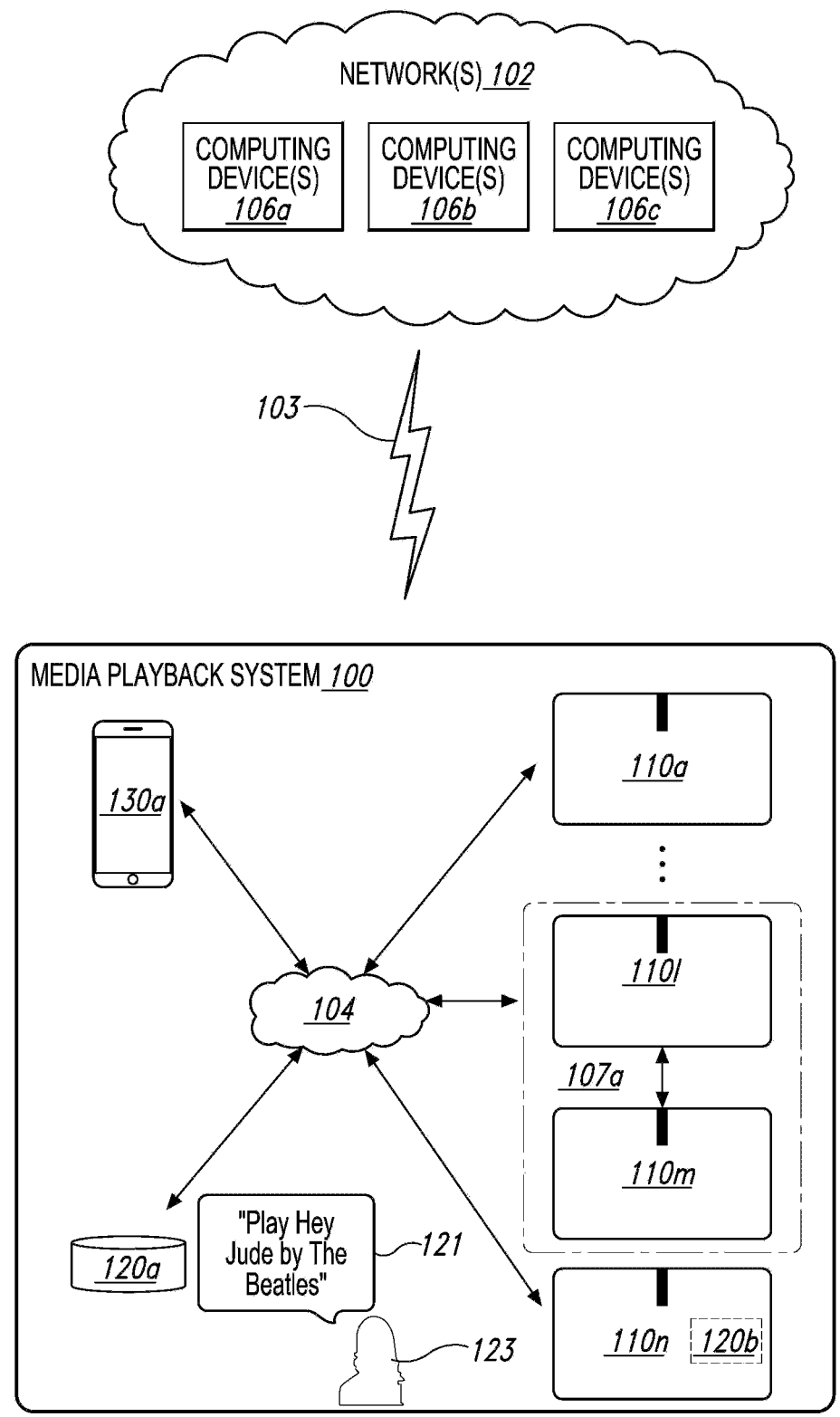
FIG. 1B shows a schematic diagram of the media playback system of FIG. 1A and one or more networks.

FIG. 1B is a schematic diagram of the media playback system 100 and a cloud network 102. For ease of illustration, certain devices of the media playback system 100 and the cloud network 102 are omitted from FIG. 1B. One or more communications links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some embodiments, the cloud network 102 is further configured to receive data (e.g. voice input data) from the media playback system 100 and correspondingly transmit commands and/or media content to the media playback system 100.

The cloud network 102 comprises computing devices 106 (identified separately as a first computing device 106a, a second computing device 106b, and a third computing device 106c). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments the cloud network 102 comprises a plurality of cloud networks comprising communicatively coupled computing devices. Furthermore, while the cloud network 102 is shown in FIG. 1B as having three of the computing devices 106, in some embodiments, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11a-i, 802.11aj, 802.11aq, 802.11ax, 802.11ay, 802.15, etc. transmitted at 2.4 Gigahertz (GHz), 5 GHz, and/or another suitable frequency.

In some embodiments, the network 104 comprises a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 comprises an existing household communication network (e.g., a household WiFi network). In some embodiments, the links 103 and the network 104 comprise one or more of the same networks. In some aspects, for example, the links 103 and the network 104 comprise a telecommunication network (e.g., an LTE network, a 5G network). Moreover, in some embodiments, the media playback system 100 is implemented without the network 104, and devices comprising the media playback system 100 can communicate with each other, for example, via one or more direct connections, PANs, telecommunication networks, and/or other suitable communications links.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some embodiments, for example, the media content database is stored on one or more of the playback devices 110, network microphone devices 120, and/or control devices 130.

In the illustrated embodiment of FIG. 1B, the playback devices 110*l* and 110*m* comprise a group 107*a*. The playback devices 110*l* and 110*m* can be positioned in different rooms in a household and be grouped together in the group 107*a* on a temporary or permanent basis based on user input received at the control device 130*a* and/or another control device 130 in the media playback system 100. When arranged in the group 107*a*, the playback devices 110*l* and 110*m* can be configured to play back the same or similar audio content in synchrony from one or more audio content sources. In certain embodiments, for example, the group 107*a* comprises a bonded zone in which the playback devices 110*l* and 110*m* comprise left audio and right audio channels, respectively, of multi-channel audio content, thereby producing or enhancing a stereo effect of the audio content. In some embodiments, the group 107*a* includes additional playback devices 110. In other embodiments, however, the media playback system 100 omits the group 107*a* and/or other grouped arrangements of the playback devices 110. Additional details regarding groups and other arrangements of playback devices are described in further detail below with respect to FIGS. 1-I through IM.

The media playback system 100 includes the NMDs 120*a* and 120*d*, each comprising one or more microphones configured to receive voice utterances from a user. In the illustrated embodiment of FIG. 1B, the NMD 120*a* is a standalone device and the NMD 120*d* is integrated into the playback device 110*n*. The NMD 120*a*, for example, is configured to receive voice input 121 from a user 123. In some embodiments, the NMD 120*a* transmits data associated with the received voice input 121 to a voice assistant service (VAS) configured to (i) process the received voice input data and (ii) transmit a corresponding command to the media playback system 100. In some aspects, for example, the computing device 106*c* comprises one or more modules and/or servers of a VAS (e.g., a VAS operated by one or more of SONOS®, AMAZON®, GOOGLE® APPLE®, MICROSOFT®). The computing device 106*c* can receive the voice input data from the NMD 120*a* via the network 104 and the links 103. In response to receiving the voice input data, the computing device 106*c* processes the voice input data (i.e., "Play Hey Jude by The Beatles"), and determines that the processed voice input includes a command to play a song (e.g., "Hey Jude"). The computing device 106*c* accordingly transmits commands to the media playback system 100 to play back "Hey Jude" by the Beatles from a suitable media service (e.g., via one or more of the computing devices 106) on one or more of the playback devices 110.

b. Suitable Playback Devices

Figure 1C:
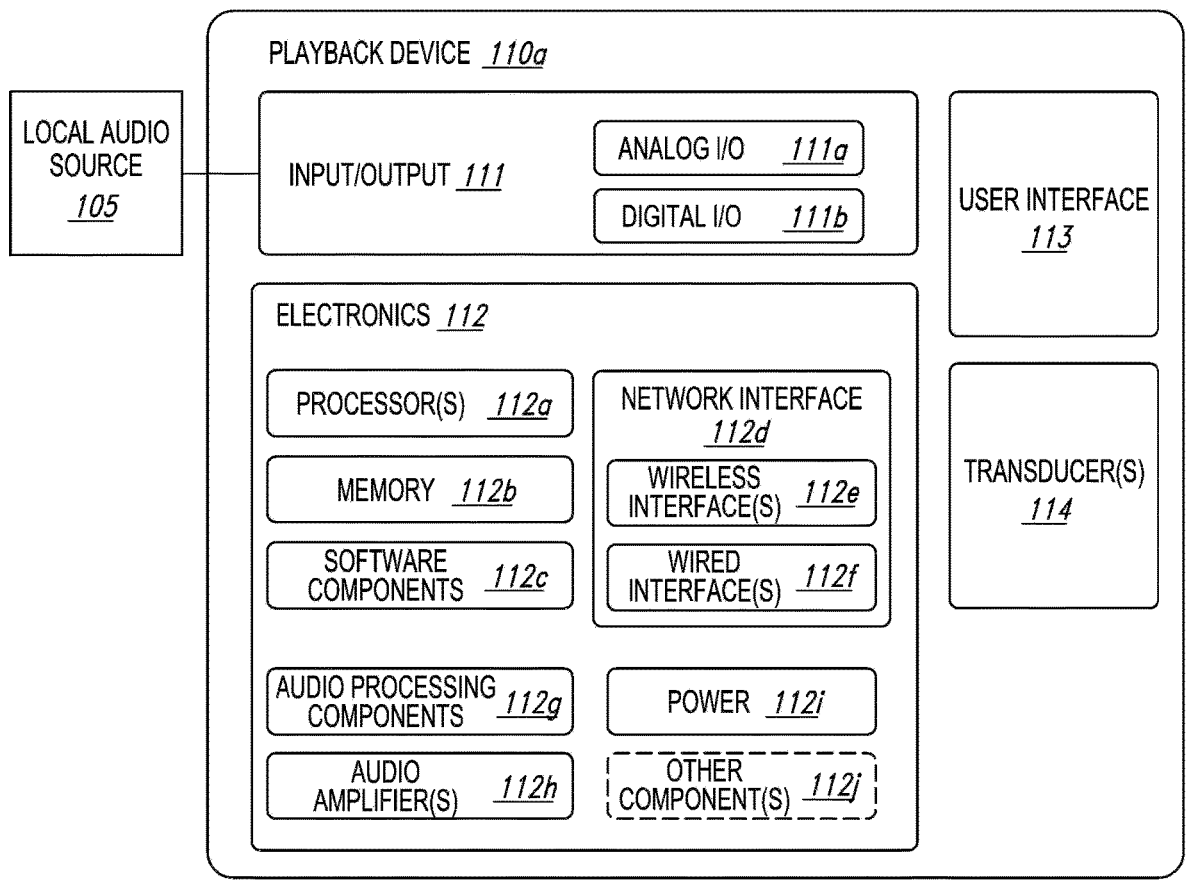
FIG. 1C shows a block diagram of a playback device.

FIG. 1C is a block diagram of the playback device 110*a* comprising an input/output 111. The input/output 111 can include an analog I/O 111*a* (e.g., one or more wires, cables, and/or other suitable communications links configured to carry analog signals) and/or a digital I/O 111*b* (e.g., one or more wires, cables, or other suitable communications links configured to carry digital signals). In some embodiments, the analog I/O 111*a* is an audio line-in input connection comprising, for example, an auto-detecting 3.5 mm audio line-in connection. In some embodiments, the digital I/O 111*b* comprises a Sony/Philips Digital Interface Format (S/PDIF) communication interface and/or cable and/or a Toshiba Link (TOSLINK) cable. In some embodiments, the digital I/O 111*b* comprises an High-Definition Multimedia Interface (HDMI) interface and/or cable. In some embodiments, the digital I/O 111*b* includes one or more wireless communications links comprising, for example, a radio frequency (RF), infrared, WiFi, Bluetooth, or another suitable communication protocol. In certain embodiments, the analog I/O 111*a* and the digital I/O 111*b* comprise interfaces (e.g., ports, plugs, jacks) configured to receive connectors of cables transmitting analog and digital signals, respectively, without necessarily including cables.

The playback device 110*a*, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communications link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110a does not include an input/output 111 and receives all audio content via the network 104.

The playback device 110a further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 is configured to receive audio from an audio source (e.g., the local audio source 105) via the input/output 111, one or more of the computing devices 106a-c via the network 104 (FIG. 1B)), amplify the received audio, and output the amplified audio for playback via one or more of the transducers 114. In some embodiments, the playback device 110a optionally includes one or more microphones 115 (e.g., a single microphone, a plurality of microphones, a microphone array) (hereinafter referred to as "the microphones 115"). In certain embodiments, for example, the playback device 110a having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112a (referred to hereinafter as "the processors 112a"), memory 112b, software components 112c, a network interface 112d, one or more audio processing components 112g (referred to hereinafter as "the audio components 112g"), one or more audio amplifiers 112h (referred to hereinafter as "the amplifiers 112h"), and power 112i (e.g., one or more power supplies, power cables, power receptacles, batteries, induction coils, Power-over Ethernet (POE) interfaces, and/or other suitable sources of electric power). In some embodiments, the electronics 112 optionally include one or more other components 112j (e.g., one or more sensors, video displays, touchscreens, battery charging bases).

The processors 112a can comprise clock-driven computing component(s) configured to process data, and the memory 112b can comprise a computer-readable medium (e.g., a tangible, non-transitory computer-readable medium, data storage loaded with one or more of the software components 112c) configured to store instructions for performing various operations and/or functions. The processors 112a are configured to execute the instructions stored on the memory 112b to perform one or more of the operations. The operations can include, for example, causing the playback device 110a to retrieve audio information from an audio source (e.g., one or more of the computing devices 106a-c (FIG. 1B)), and/or another one of the playback devices 110. In some embodiments, the operations further include causing the playback device 110a to send audio information to another one of the playback devices 110a and/or another device (e.g., one of the NMDs 120). Certain embodiments include operations causing the playback device 110a to pair with another of the one or more playback devices 110 to enable a multi-channel audio environment (e.g., a stereo pair, a bonded zone).

The processors 112a can be further configured to perform operations causing the playback device 110a to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110a and the other one or more other playback devices 110. Additional details regarding audio playback synchronization among playback devices can be found, for example, in U.S. Pat. No. 8,234,395, which was incorporated by reference above.

In some embodiments, the memory 112b is further configured to store data associated with the playback device 110a, such as one or more zones and/or zone groups of which the playback device 110a is a member, audio sources accessible to the playback device 110a, and/or a playback queue that the playback device 110a (and/or another of the one or more playback devices) can be associated with. The stored data can comprise one or more state variables that are periodically updated and used to describe a state of the playback device 110a. The memory 112b can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112d is configured to facilitate a transmission of data between the playback device 110a and one or more other devices on a data network such as, for example, the links 103 and/or the network 104 (FIG. 1B). The network interface 112d is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112d can parse the digital packet data such that the electronics 112 properly receives and processes the data destined for the playback device 110a.

In the illustrated embodiment of FIG. 1C, the network interface 112d comprises one or more wireless interfaces 112e (referred to hereinafter as "the wireless interface 112e"). The wireless interface 112e (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some embodiments, the network interface 112d optionally includes a wired interface 112f (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112d includes the wired interface 112f and excludes the wireless interface 112e. In some embodiments, the electronics 112 excludes the network interface 112d altogether and transmits and receives media content and/or other data via another communication path (e.g., the input/output 111).

The audio processing components 112g are configured to process and/or filter data comprising media content received by the electronics 112 (e.g., via the input/output 111 and/or the network interface 112*d*) to produce output audio signals. In some embodiments, the audio processing components 112*g* comprise, for example, one or more digital-to-analog converters (DAC), audio preprocessing components, audio enhancement components, a digital signal processors (DSPs), and/or other suitable audio processing components, modules, circuits, etc. In certain embodiments, one or more of the audio processing components 112*g* can comprise one or more subcomponents of the processors 112*a*. In some embodiments, the electronics 112 omits the audio processing components 112*g*. In some aspects, for example, the processors 112*a* execute instructions stored on the memory 112*b* to perform audio processing operations to produce the output audio signals.

The amplifiers 112*h* are configured to receive and amplify the audio output signals produced by the audio processing components 112*g* and/or the processors 112*a*. The amplifiers 112*h* can comprise electronic devices and/or components configured to amplify audio signals to levels sufficient for driving one or more of the transducers 114. In some embodiments, for example, the amplifiers 112*h* include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112*h* comprise a suitable combination of two or more of the foregoing types of power amplifiers. Moreover, in some embodiments, individual ones of the amplifiers 112*h* correspond to individual ones of the transducers 114. In other embodiments, however, the electronics 112 includes a single one of the amplifiers 112*h* configured to output amplified audio signals to a plurality of the transducers 114. In some other embodiments, the electronics 112 omits the amplifiers 112*h*.

The transducers 114 (e.g., one or more speakers and/or speaker drivers) receive the amplified audio signals from the amplifier 112*h* and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

Figure 1D:
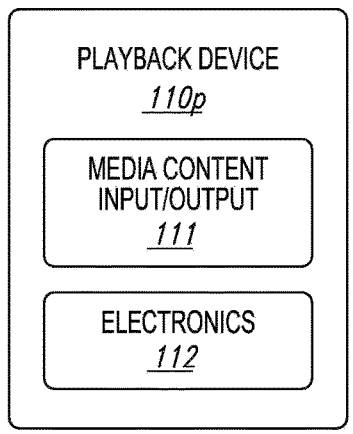
FIG. 1D shows a block diagram of a playback device.

By way of illustration, SONOS, Inc. presently offers (or has offered) for sale certain playback devices including, for example, a "SONOS ONE," "PLAY:1," "PLAY:3," "PLAY: 5," "PLAYBAR," "PLAYBASE," "CONNECT:AMP," "CONNECT," and "SUB." Other suitable playback devices may additionally or alternatively be used to implement the playback devices of example embodiments disclosed herein. Additionally, one of ordinary skilled in the art will appreciate that a playback device is not limited to the examples described herein or to SONOS product offerings. In some embodiments, for example, one or more playback devices 110 comprises wired or wireless headphones (e.g., over-the-ear headphones, on-ear headphones, in-ear earphones). In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110*p* comprising the input/output 111 and electronics 112 without the user interface 113 or transducers 114.

Figure 1E:
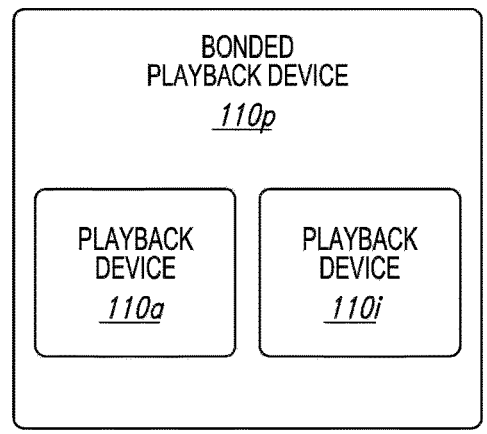
FIG. 1E shows a block diagram of a network microphone device.

FIG. 1E is a block diagram of a bonded playback device 110*q* comprising the playback device 110*a* (FIG. 1C) sonically bonded with the playback device 110*i* (e.g., a subwoofer) (FIG. 1A). In the illustrated embodiment, the playback devices 110*a* and 110*i* are separate ones of the playback devices 110 housed in separate enclosures. In some embodiments, however, the bonded playback device 110*q* comprises a single enclosure housing both the playback devices 110*a* and 110*i*. The bonded playback device 110*q* can be configured to process and reproduce sound differently than an unbonded playback device (e.g., the playback device 110*a* of FIG. 1C) and/or paired or bonded playback devices (e.g., the playback devices 110*l* and 110*m* of FIG. 1B). In some embodiments, for example, the playback device 110*a* is full-range playback device configured to render low frequency, mid-range frequency, and high frequency audio content, and the playback device 110*i* is a subwoofer configured to render low frequency audio content. In some aspects, the playback device 110*a*, when bonded with the first playback device, is configured to render only the mid-range and high frequency components of a particular audio content, while the playback device 110*i* renders the low frequency component of the particular audio content. In some embodiments, the bonded playback device 110*q* includes additional playback devices and/or another bonded playback device. Additional playback device embodiments are described in further detail below with respect to FIGS. 2A-3D.

c. Suitable Network Microphone Devices (NMDs)

FIG. 1F is a block diagram of the NMD 120*a* (FIGS. 1A and 1B). The NMD 120*a* includes one or more voice processing components 124 (hereinafter "the voice components 124") and several components described with respect to the playback device 110*a* (FIG. 1C) including the processors 112*a*, the memory 112*b*, and the microphones 115. The NMD 120*a* optionally comprises other components also included in the playback device 110*a* (FIG. 1C), such as the user interface 113 and/or the transducers 114. In some embodiments, the NMD 120*a* is configured as a media playback device (e.g., one or more of the playback devices 110), and further includes, for example, one or more of the audio processing components 112*g* (FIG. 1C), the transducers 114, and/or other playback device components. In certain embodiments, the NMD 120*a* comprises an Internet of Things (IoT) device such as, for example, a thermostat, alarm panel, fire and/or smoke detector, etc. In some embodiments, the NMD 120*a* comprises the microphones 115, the voice processing 124, and only a portion of the components of the electronics 112 described above with respect to FIG. 1B. In some aspects, for example, the NMD 120a includes the processor 112a and the memory 112b (FIG. 1B), while omitting one or more other components of the electronics 112. In some embodiments, the NMD 120a includes additional components (e.g., one or more sensors, cameras, thermometers, barometers, hygrometers).

In some embodiments, an NMD can be integrated into a playback device. FIG. 1G is a block diagram of a playback device 110r comprising an NMD 120d. The playback device 110r can comprise many or all of the components of the playback device 110a and further include the microphones 115 and voice processing 124 (FIG. 1F). The playback device 110r optionally includes an integrated control device 130c. The control device 130c can comprise, for example, a user interface (e.g., the user interface 113 of FIG. 1B) configured to receive user input (e.g., touch input, voice input) without a separate control device. In other embodiments, however, the playback device 110r receives commands from another control device (e.g., the control device 130a of FIG. 1B). Additional NMD embodiments are described in further detail below with respect to FIGS. 3A-3F.

Referring again to FIG. 1F, the microphones 115 are configured to acquire, capture, and/or receive sound from an environment (e.g., the environment 101 of FIG. 1A) and/or a room in which the NMD 120a is positioned. The received sound can include, for example, vocal utterances, audio played back by the NMD 120a and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home. Additional description regarding receiving and processing voice input data can be found in further detail below with respect to FIGS. 3A-3F.

d. Suitable Control Devices

FIG. 1H is a partially schematic diagram of the control device 130a (FIGS. 1A and 1B). As used herein, the term "control device" can be used interchangeably with "controller" or "control system." Among other features, the control device 130a is configured to receive user input related to the media playback system 100 and, in response, cause one or more devices in the media playback system 100 to perform an action(s) or operation(s) corresponding to the user input. In the illustrated embodiment, the control device 130a comprises a smartphone (e.g., an iPhone™, an Android phone) on which media playback system controller application software is installed. In some embodiments, the control device 130a comprises, for example, a tablet (e.g., an iPad'), a computer (e.g., a laptop computer, a desktop computer), and/or another suitable device (e.g., a television, an automobile audio head unit, an IoT device). In certain embodiments, the control device 130a comprises a dedicated controller for the media playback system 100. In other embodiments, as described above with respect to FIG. 1G, the control device 130a is integrated into another device in the media playback system 100 (e.g., one more of the playback devices 110, NMDs 120, and/or other suitable devices configured to communicate over a network).

The control device 130a includes electronics 132, a user interface 133, one or more speakers 134, and one or more microphones 135. The electronics 132 comprise one or more processors 132a (referred to hereinafter as "the processors 132a"), a memory 132b, software components 132c, and a network interface 132d. The processor 132a can be configured to perform functions relevant to facilitating user access, control, and configuration of the media playback system 100. The memory 132b can comprise data storage that can be loaded with one or more of the software components executable by the processor 302 to perform those functions. The software components 132c can comprise applications and/or other executable software configured to facilitate control of the media playback system 100. The memory 112b can be configured to store, for example, the software components 132c, media playback system controller application software, and/or other data associated with the media playback system 100 and the user.

The network interface 132d is configured to facilitate network communications between the control device 130a and one or more other devices in the media playback system 100, and/or one or more remote devices. In some embodiments, the network interface 132d is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132d can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132d can transmit a playback device control command (e.g., volume control, audio playback control, audio content selection) from the control device 304 to one or more of playback devices. The network interface 132d can also transmit and/or receive configuration changes such as, for example, adding/removing one or more playback devices to/from a zone, adding/removing one or more zones to/from a zone group, forming a bonded or consolidated player, separating one or more playback devices from a bonded or consolidated player, among others. Additional description of zones and groups can be found below with respect to FIGS. 1-I through 1M.

The user interface 133 is configured to receive user input and can facilitate control of the media playback system 100. The user interface 133 includes media content art 133a (e.g., album art, lyrics, videos), a playback status indicator 133b (e.g., an elapsed and/or remaining time indicator), media content information region 133c, a playback control region 133d, and a zone indicator 133e. The media content information region 133c can include a display of relevant information (e.g., title, artist, album, genre, release year) about media content currently playing and/or media content in a queue or playlist. The playback control region 133d can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133d may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130a. In some embodiments, the one or more speakers comprise individual transducers configured to correspondingly output low frequencies, mid-range frequencies, and/or high frequencies. In some aspects, for example, the control device 130a is configured as a playback device (e.g., one of the playback devices 110). Similarly, in some embodiments the control device 130a is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130a is configured to operate as playback device and an NMD. In other embodiments, however, the control device 130a omits the one or more speakers 134 and/or the one or more microphones 135. For instance, the control device 130a may comprise a device (e.g., a thermostat, an IoT device, a network device) comprising a portion of the electronics 132 and the user interface 133 (e.g., a touch screen) without any speakers or microphones. Additional control device embodiments are described in further detail below with respect to FIGS. 4A-4D and 5.

e. Suitable Playback Device Configurations

Figure 1M:
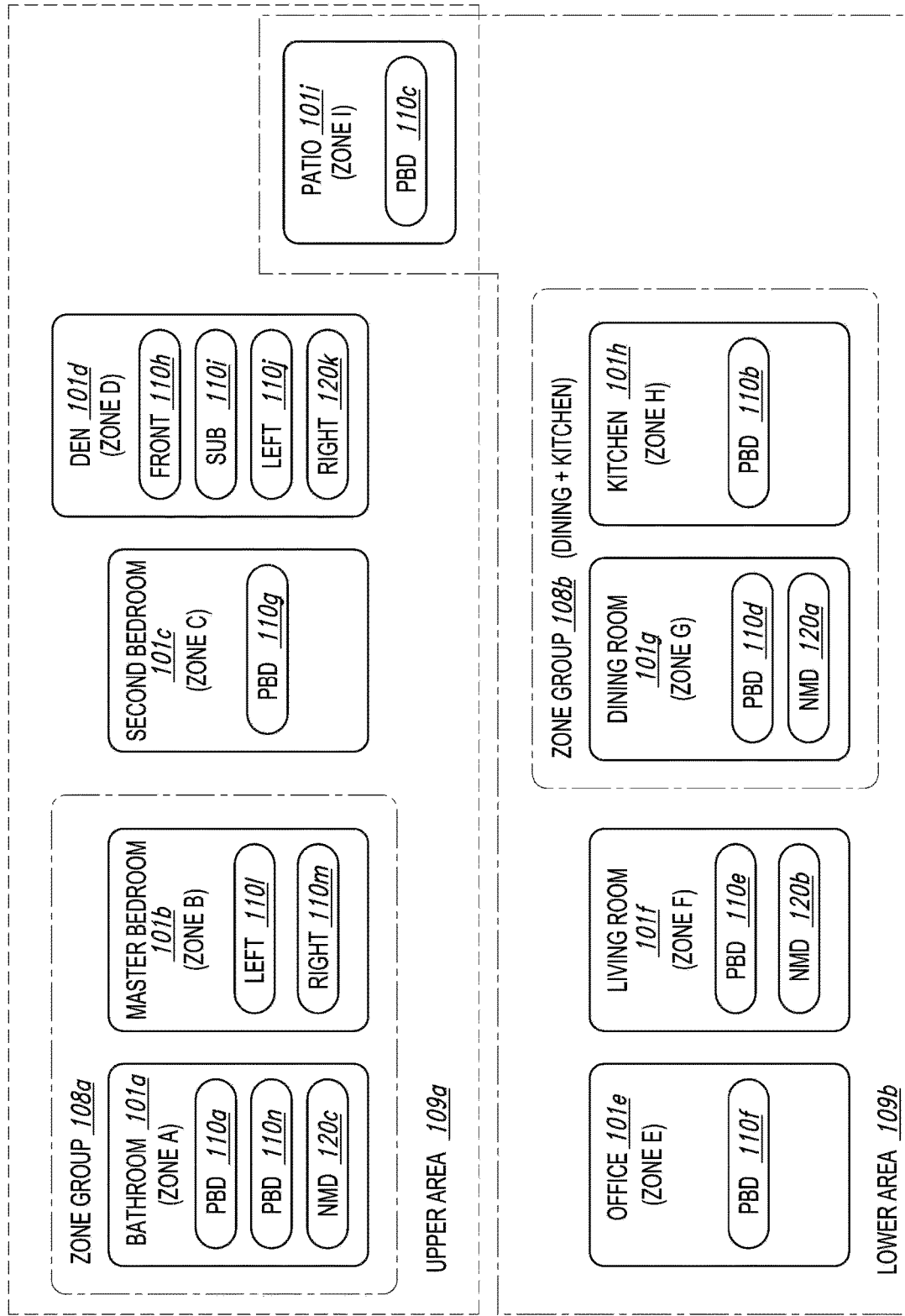
FIG. 1M shows a schematic diagram of media playback system areas.

FIGS. 1-1 through 1M show example configurations of playback devices in zones and zone groups. Referring first to FIG. 1M, in one example, a single playback device may belong to a zone. For example, the playback device 110g in the second bedroom 101c (FIG. 1A) may belong to Zone C. In some implementations described below, multiple playback devices may be "bonded" to form a "bonded pair" which together form a single zone. For example, the playback device 110l (e.g., a left playback device) can be bonded to the playback device 110l (e.g., a left playback device) to form Zone A. Bonded playback devices may have different playback responsibilities (e.g., channel responsibilities). In another implementation described below, multiple playback devices may be merged to form a single zone. For example, the playback device 110h (e.g., a front playback device) may be merged with the playback device 110i (e.g., a subwoofer), and the playback devices 110j and 110k (e.g., left and right surround speakers, respectively) to form a single Zone D. In another example, the playback devices 110g and 110h can be merged to form a merged group or a zone group 108b. The merged playback devices 110g and 110h may not be specifically assigned different playback responsibilities. That is, the merged playback devices 110h and 110i may, aside from playing audio content in synchrony, each play audio content as they would if they were not merged.

Each zone in the media playback system 100 may be provided for control as a single user interface (UI) entity. For example, Zone A may be provided as a single entity named Master Bathroom. Zone B may be provided as a single entity named Master Bedroom. Zone C may be provided as a single entity named Second Bedroom.

Playback devices that are bonded may have different playback responsibilities, such as responsibilities for certain audio channels. For example, as shown in FIG. 1-I, the playback devices 110l and 110m may be bonded so as to produce or enhance a stereo effect of audio content. In this example, the playback device 110l may be configured to play a left channel audio component, while the playback device 110k may be configured to play a right channel audio component. In some implementations, such stereo bonding may be referred to as "pairing."

Additionally, bonded playback devices may have additional and/or different respective speaker drivers. As shown in FIG. 1J, the playback device 110h named Front may be bonded with the playback device 110i named SUB. The Front device 110h can be configured to render a range of mid to high frequencies and the SUB device 110i can be configured render low frequencies. When unbonded, however, the Front device 110h can be configured render a full range of frequencies. As another example, FIG. 1K shows the Front and SUB devices 110h and 110i further bonded with Left and Right playback devices 110j and 110k, respectively. In some implementations, the Right and Left devices 110j and 102k can be configured to form surround or "satellite" channels of a home theater system. The bonded playback devices 110h, 110i, 110j, and 110k may form a single Zone D (FIG. 1M).

Playback devices that are merged may not have assigned playback responsibilities, and may each render the full range of audio content the respective playback device is capable of. Nevertheless, merged devices may be represented as a single UI entity (i.e., a zone, as discussed above). For instance, the playback devices 110a and 110n the master bathroom have the single UI entity of Zone A. In one embodiment, the playback devices 110a and 110n may each output the full range of audio content each respective playback devices 110a and 110n are capable of, in synchrony.

In some embodiments, an NMD is bonded or merged with another device so as to form a zone. For example, the NMD 120b may be bonded with the playback device 110e, which together form Zone F, named Living Room. In other embodiments, a stand-alone network microphone device may be in a zone by itself. In other embodiments, however, a stand-alone network microphone device may not be associated with a zone. Additional details regarding associating network microphone devices and playback devices as designated or default devices may be found, for example, in previously referenced U.S. patent application Ser. No. 15/438,749.

Zones of individual, bonded, and/or merged devices may be grouped to form a zone group. For example, referring to FIG. 1M, Zone A may be grouped with Zone B to form a zone group 108a that includes the two zones. Similarly, Zone G may be grouped with Zone H to form the zone group 108b. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Playback devices may be dynamically grouped and ungrouped to form new or different groups that synchronously play back audio content.

In various implementations, the zones in an environment may be the default name of a zone within the group or a combination of the names of the zones within a zone group. For example, Zone Group 108b can have be assigned a name such as "Dining+Kitchen", as shown in FIG. 1M. In some embodiments, a zone group may be given a unique name selected by a user.

Certain data may be stored in a memory of a playback device (e.g., the memory 112b of FIG. 1C) as one or more state variables that are periodically updated and used to describe the state of a playback zone, the playback device(s), and/or a zone group associated therewith. The memory may also include the data associated with the state of the other devices of the media system, and shared from time to time among the devices so that one or more of the devices have the most recent data associated with the system.

In some embodiments, the memory may store instances of various variable types associated with the states. Variables instances may be stored with identifiers (e.g., tags) corresponding to type. For example, certain identifiers may be a first type "a1" to identify playback device(s) of a zone, a second type "b 1" to identify playback device(s) that may be bonded in the zone, and a third type "c1" to identify a zone group to which the zone may belong. As a related example, identifiers associated with the second bedroom 101c may indicate that the playback device is the only playback device of the Zone C and not in a zone group. Identifiers associated with the Den may indicate that the Den is not grouped with other zones but includes bonded playback devices 110h-110k. Identifiers associated with the Dining Room may indicate that the Dining Room is part of the Dining+Kitchen zone group 108b and that devices 110b and 110d are grouped (FIG. 1L). Identifiers associated with the Kitchen may indicate the same or similar information by virtue of the Kitchen being part of the Dining+Kitchen zone group 108b. Other example zone variables and identifiers are described below.

In yet another example, the media playback system 100 may variables or identifiers representing other associations of zones and zone groups, such as identifiers associated with Areas, as shown in FIG. 1M. An area may involve a cluster of zone groups and/or zones not within a zone group. For instance, FIG. 1M shows an Upper Area 109a including Zones A-D, and a Lower Area 109b including Zones E-I. In one aspect, an Area may be used to invoke a cluster of zone groups and/or zones that share one or more zones and/or zone groups of another cluster. In another aspect, this differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the media playback system 100 may not implement Areas, in which case the system may not store variables associated with Areas.

III. Example Systems and Devices

Figure 2A:
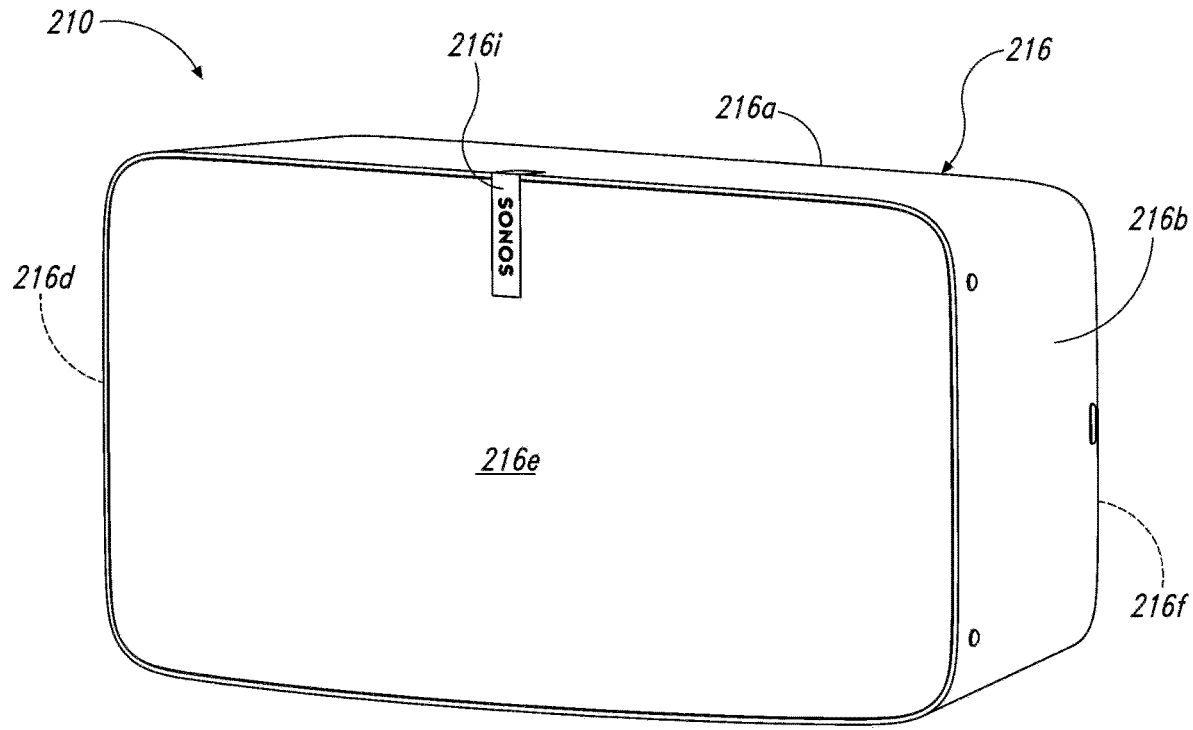
FIG. 2A shows a front isometric view of a playback device configured in accordance with aspects of the disclosed technology.
Figure 2B:
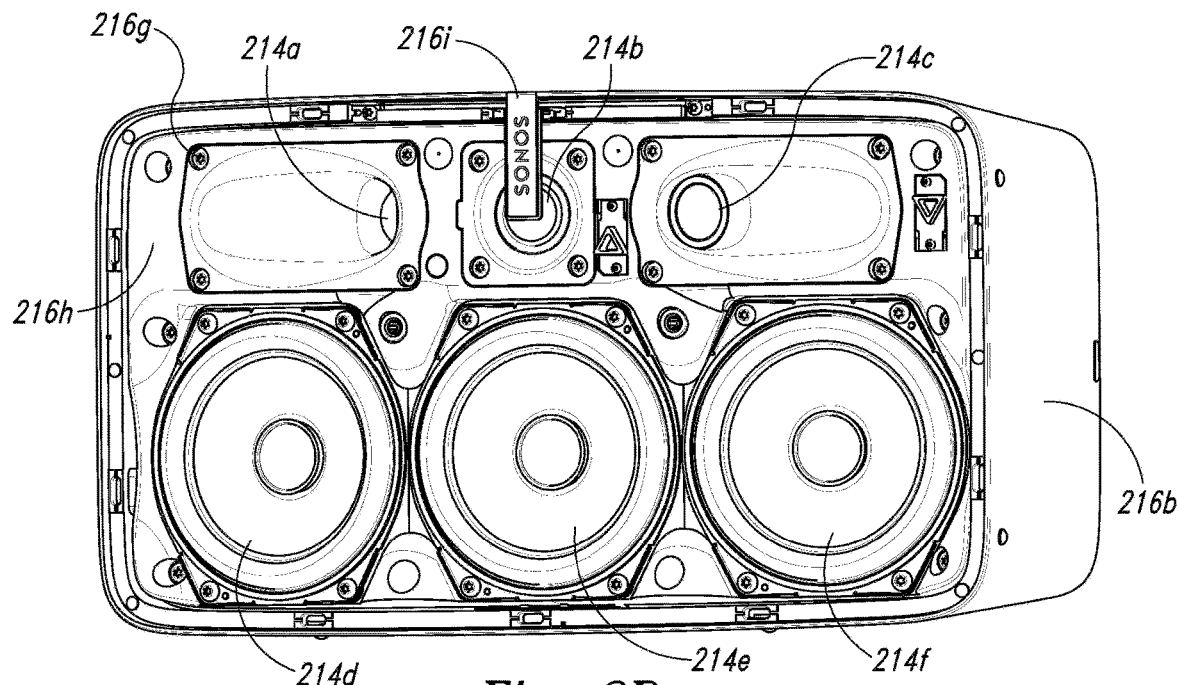
FIG. 2B shows a front isometric view of the playback device of FIG. 3A without a grille.
Figure 2C:
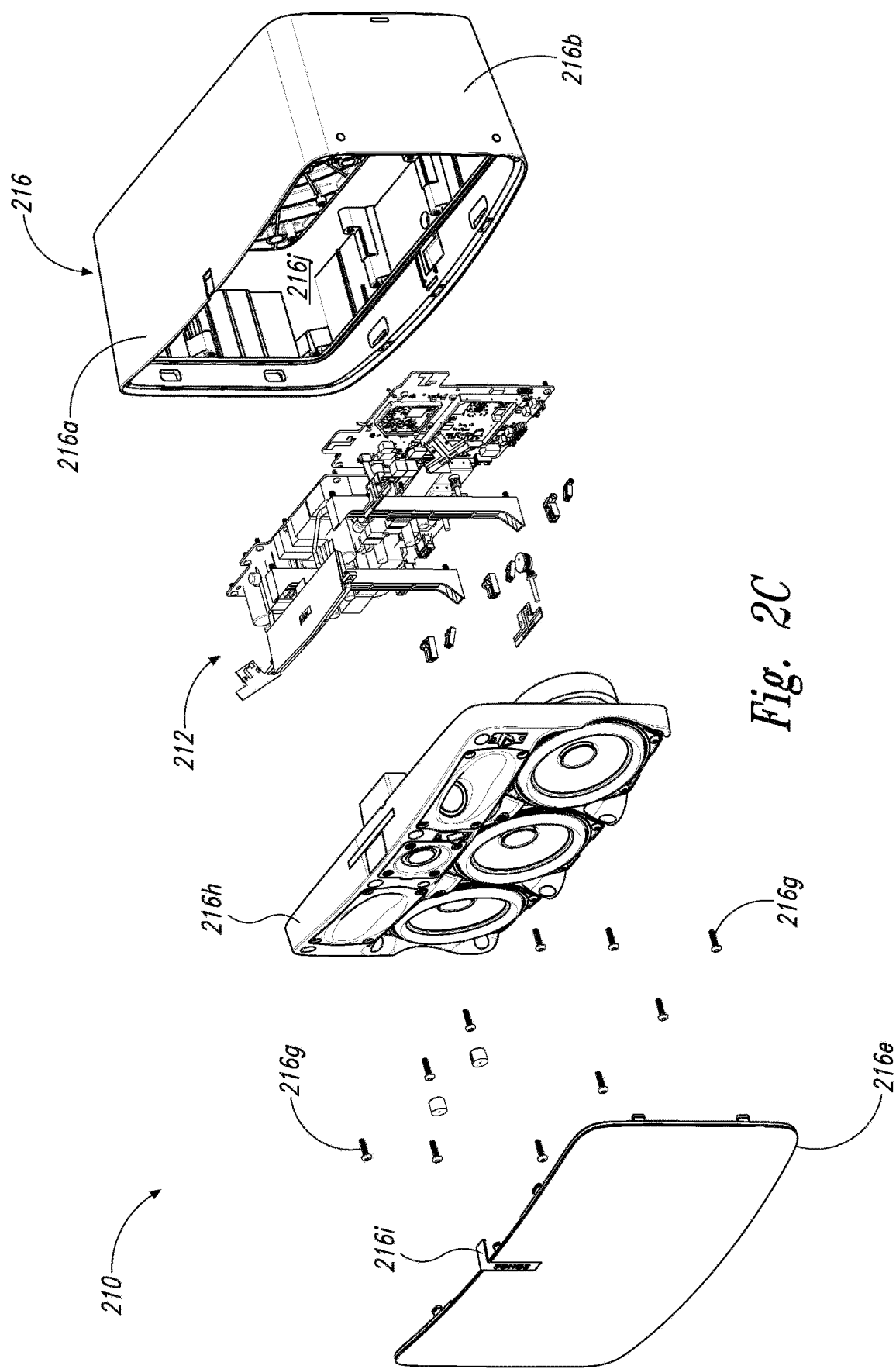
FIG. 2C shows an exploded view of the playback device of FIG. 2A.

FIG. 2A is a front isometric view of a playback device 210 configured in accordance with aspects of the disclosed technology. FIG. 2B is a front isometric view of the playback device 210 without a grille 216e. FIG. 2C is an exploded view of the playback device 210. Referring to FIGS. 2A-2C together, the playback device 210 comprises a housing 216 that includes an upper portion 216a, a right or first side portion 216b, a lower portion 216c, a left or second side portion 216d, the grille 216e, and a rear portion 216f. A plurality of fasteners 216g (e.g., one or more screws, rivets, clips) attaches a frame 216h to the housing 216. A cavity 216j (FIG. 2C) in the housing 216 is configured to receive the frame 216h and electronics 212. The frame 216h is configured to carry a plurality of transducers 214 (identified individually in FIG. 2B as transducers 214a-f). The electronics 212 (e.g., the electronics 112 of FIG. 1C) is configured to receive audio content from an audio source and send electrical signals corresponding to the audio content to the transducers 214 for playback.

The transducers 214 are configured to receive the electrical signals from the electronics 112, and further configured to convert the received electrical signals into audible sound during playback. For instance, the transducers 214a-c (e.g., tweeters) can be configured to output high frequency sound (e.g., sound waves having a frequency greater than about 2 kHz). The transducers 214d-f (e.g., mid-woofers, woofers, midrange speakers) can be configured output sound at frequencies lower than the transducers 214a-c (e.g., sound waves having a frequency lower than about 2 kHz). In some embodiments, the playback device 210 includes a number of transducers different than those illustrated in FIGS. 2A-2C. For example, as described in further detail below with respect to FIGS. 3A-3C, the playback device 210 can include fewer than six transducers (e.g., one, two, three). In other embodiments, however, the playback device 210 includes more than six transducers (e.g., nine, ten). Moreover, in some embodiments, all or a portion of the transducers 214 are configured to operate as a phased array to desirably adjust (e.g., narrow or widen) a radiation pattern of the transducers 214, thereby altering a user's perception of the sound emitted from the playback device 210.

In the illustrated embodiment of FIGS. 2A-2C, a filter 216i is axially aligned with the transducer 214b. The filter 216i can be configured to desirably attenuate a predetermined range of frequencies that the transducer 214b outputs to improve sound quality and a perceived sound stage output collectively by the transducers 214. In some embodiments, however, the playback device 210 omits the filter 216i. In other embodiments, the playback device 210 includes one or more additional filters aligned with the transducers 214b and/or at least another of the transducers 214.

Figure 3A:
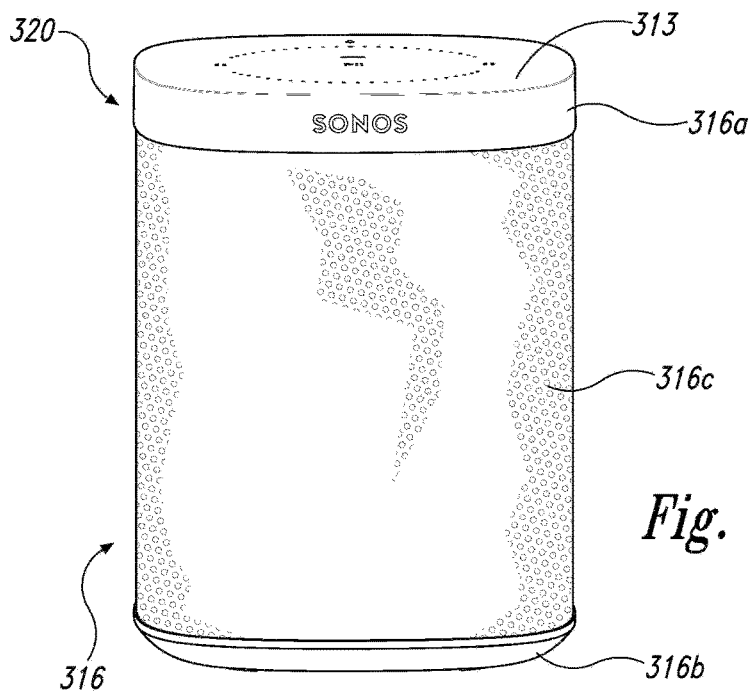
FIG. 3A shows a front view of a network microphone device configured in accordance with aspects of the disclosed technology.
Figure 3B:
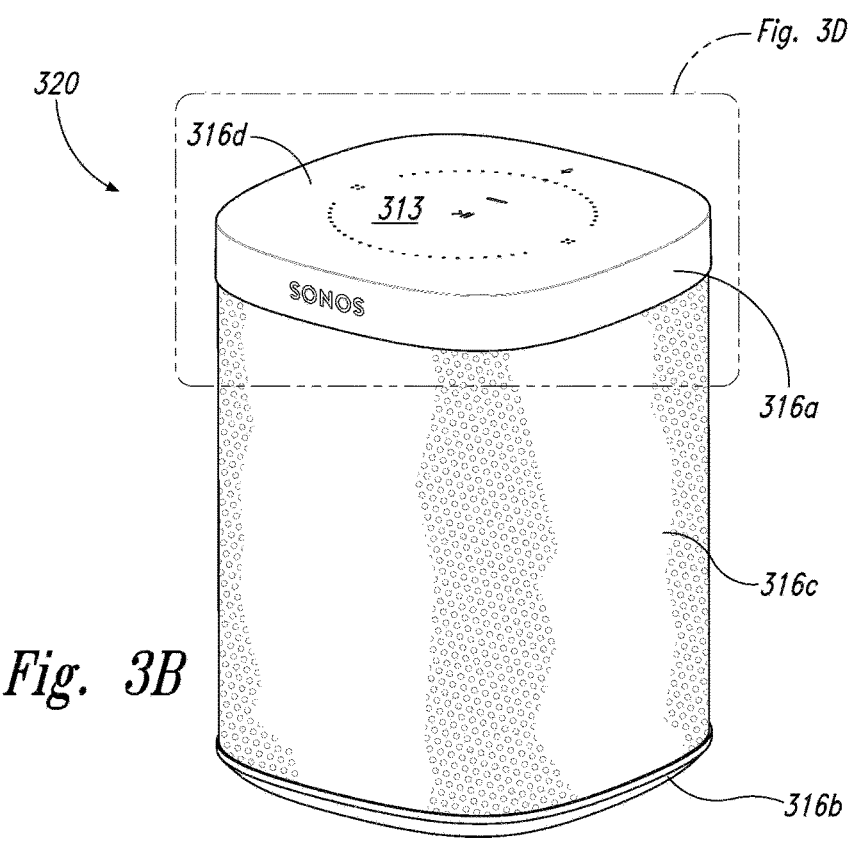
FIG. 3B shows a side isometric view of the network microphone device of FIG. 3A.
Figure 3C:
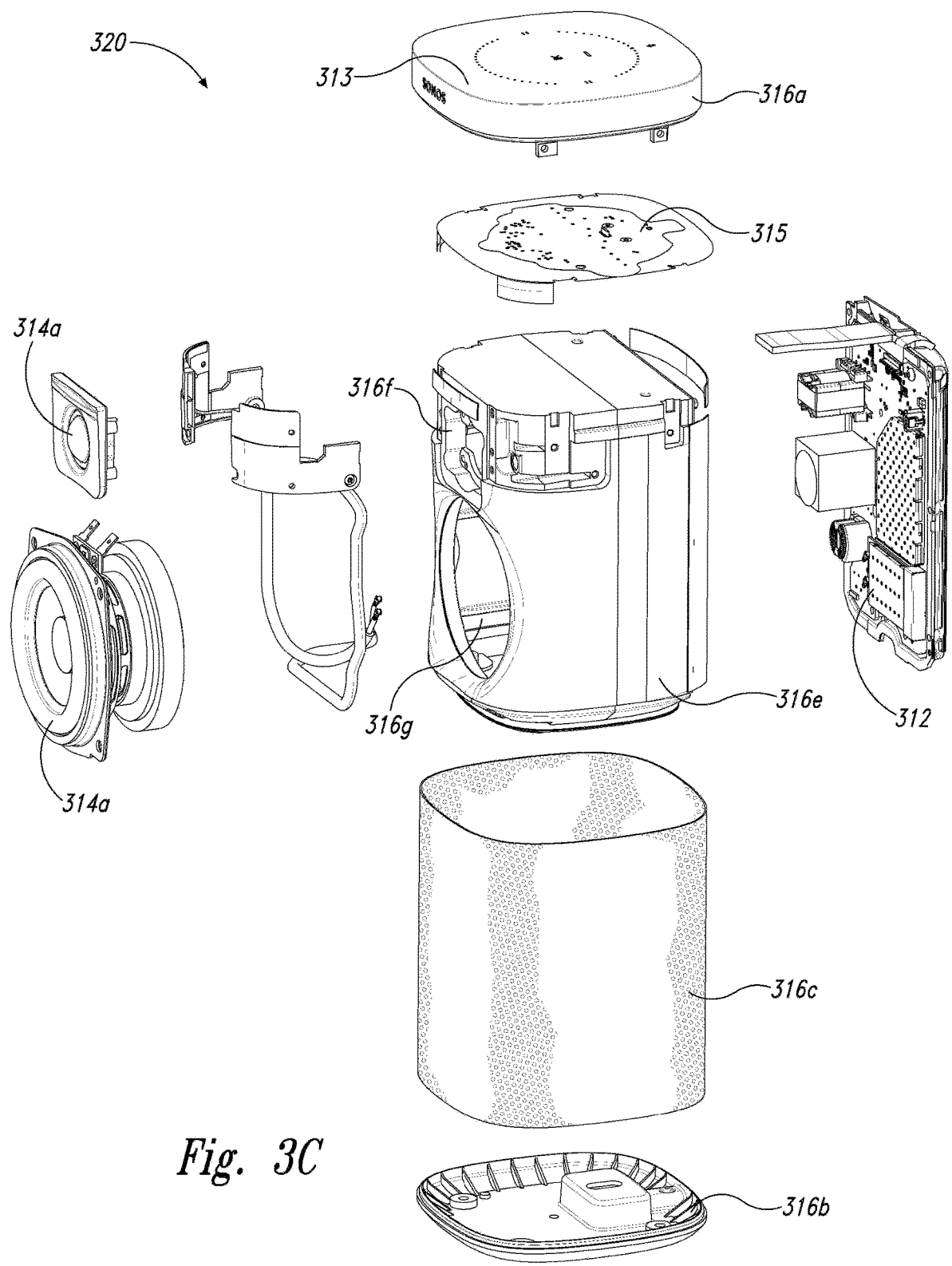
FIG. 3C shows an exploded view of the network microphone device of FIGS. 3A and 3B.
Figure 3D:
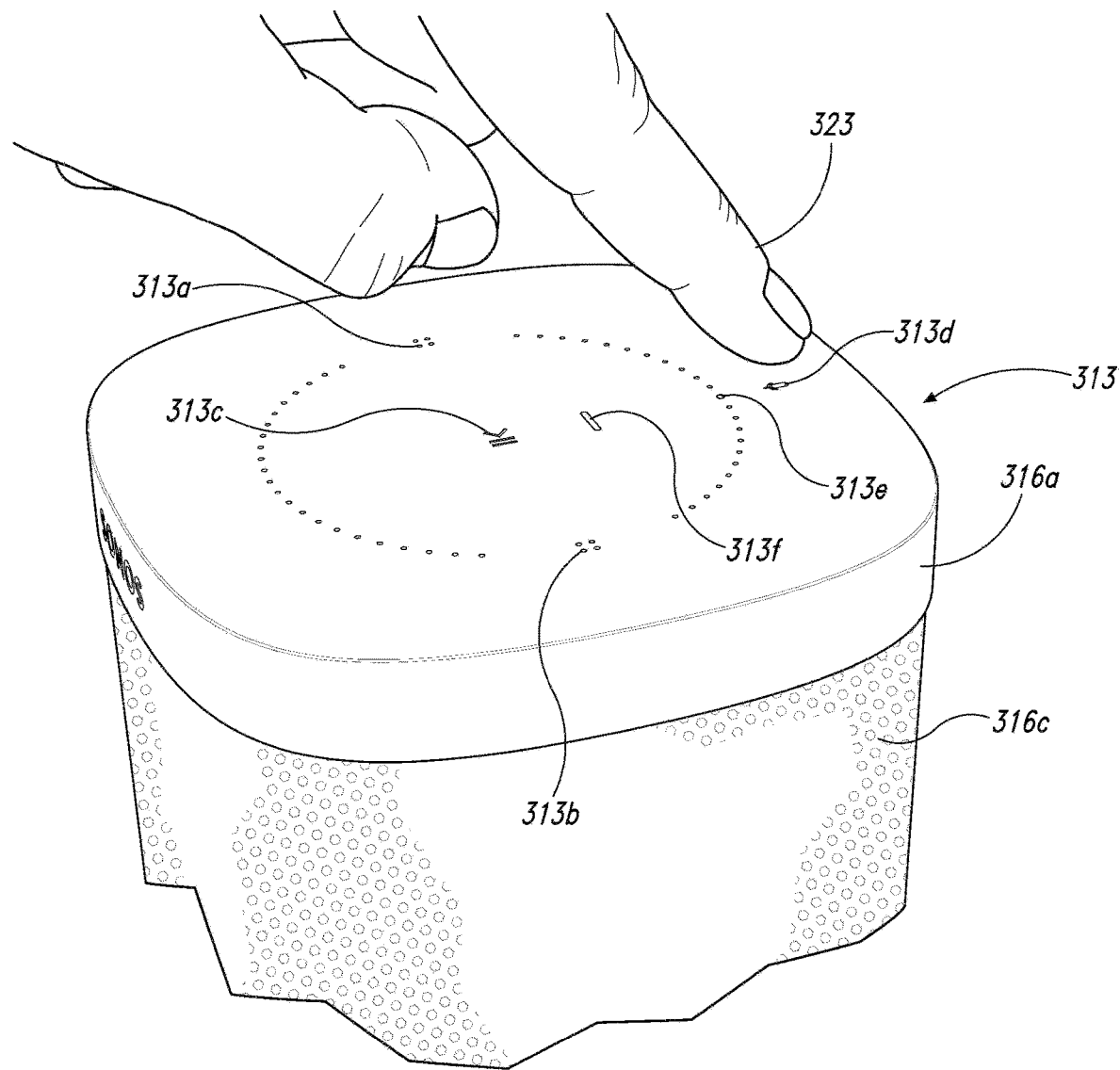
FIG. 3D shows an enlarged view of a portion of FIG. 3B.

FIGS. 3A and 3B are front and right isometric side views, respectively, of an NMD 320 configured in accordance with embodiments of the disclosed technology. FIG. 3C is an exploded view of the NMD 320. FIG. 3D is an enlarged view of a portion of FIG. 3B including a user interface 313 of the NMD 320. Referring first to FIGS. 3A-3C, the NMD 320 includes a housing 316 comprising an upper portion 316a, a lower portion 316b and an intermediate portion 316c (e.g., a grille). A plurality of ports, holes or apertures 316d in the upper portion 316a allow sound to pass through to one or more microphones 315 (FIG. 3C) positioned within the housing 316. The one or more microphones 316 are configured to received sound via the apertures 316d and produce electrical signals based on the received sound. In the illustrated embodiment, a frame 316e (FIG. 3C) of the housing 316 surrounds cavities 316f and 316g configured to house, respectively, a first transducer 314a (e.g., a tweeter) and a second transducer 314b (e.g., a mid-woofer, a midrange speaker, a woofer). In other embodiments, however, the NMD 320 includes a single transducer, or more than two (e.g., two, five, six) transducers. In certain embodiments, the NMD 320 omits the transducers 314a and 314b altogether.

Electronics 312 (FIG. 3C) includes components configured to drive the transducers 314a and 314b, and further configured to analyze audio information corresponding to the electrical signals produced by the one or more microphones 315. In some embodiments, for example, the electronics 312 comprises many or all of the components of the electronics 112 described above with respect to FIG. 1C. In certain embodiments, the electronics 312 includes components described above with respect to FIG. 1F such as, for example, the one or more processors 112a, the memory 112b, the software components 112c, the network interface 112d, etc. In some embodiments, the electronics 312 includes additional suitable components (e.g., proximity or other sensors).

Referring to FIG. 3D, the user interface 313 includes a plurality of control surfaces (e.g., buttons, knobs, capacitive surfaces) including a first control surface 313a (e.g., a previous control), a second control surface 313b (e.g., a next control), and a third control surface 313c (e.g., a play and/or pause control). A fourth control surface 313d is configured to receive touch input corresponding to activation and deactivation of the one or microphones 315. A first indicator 313e (e.g., one or more light emitting diodes (LEDs) or another suitable illuminator) can be configured to illuminate only when the one or more microphones 315 are activated. A second indicator 313f (e.g., one or more LEDs) can be configured to remain solid during normal operation and to blink or otherwise change from solid to indicate a detection of voice activity. In some embodiments, the user interface 313 includes additional or fewer control surfaces and illuminators. In one embodiment, for example, the user interface 313 includes the first indicator 313e, omitting the second indicator 313f. Moreover, in certain embodiments, the NMD 320 comprises a playback device and a control device, and the user interface 313 comprises the user interface of the control device.

Referring to FIGS. 3A-3D together, the NMD 320 is configured to receive voice commands from one or more adjacent users via the one or more microphones 315. As described above with respect to FIG. 1B, the one or more microphones 315 can acquire, capture, or record sound in a vicinity (e.g., a region within 10 m or less of the NMD 320) and transmit electrical signals corresponding to the recorded sound to the electronics 312. The electronics 312 can process the electrical signals and can analyze the resulting audio data to determine a presence of one or more voice commands (e.g., one or more activation words). In some embodiments, for example, after detection of one or more suitable voice commands, the NMD 320 is configured to transmit a portion of the recorded audio data to another device and/or a remote server (e.g., one or more of the computing devices 106 of FIG. 1B) for further analysis. The remote server can analyze the audio data, determine an appropriate action based on the voice command, and transmit a message to the NMD 320 to perform the appropriate action. For instance, a user may speak "Sonos, play Michael Jackson." The NMD 320 can, via the one or more microphones 315, record the user's voice utterance, determine the presence of a voice command, and transmit the audio data having the voice command to a remote server (e.g., one or more of the remote computing devices 106 of FIG. 1B, one or more servers of a VAS and/or another suitable service). The remote server can analyze the audio data and determine an action corresponding to the command. The remote server can then transmit a command to the NMD 320 to perform the determined action (e.g., play back audio content related to Michael Jackson). The NMD 320 can receive the command and play back the audio content related to Michael Jackson from a media content source. As described above with respect to FIG. 1B, suitable content sources can include a device or storage communicatively coupled to the NMD 320 via a LAN (e.g., the network 104 of FIG. 1B), a remote server (e.g., one or more of the remote computing devices 106 of FIG. 1B), etc. In certain embodiments, however, the NMD 320 determines and/or performs one or more actions corresponding to the one or more voice commands without intervention or involvement of an external device, computer, or server.

Figure 3E:
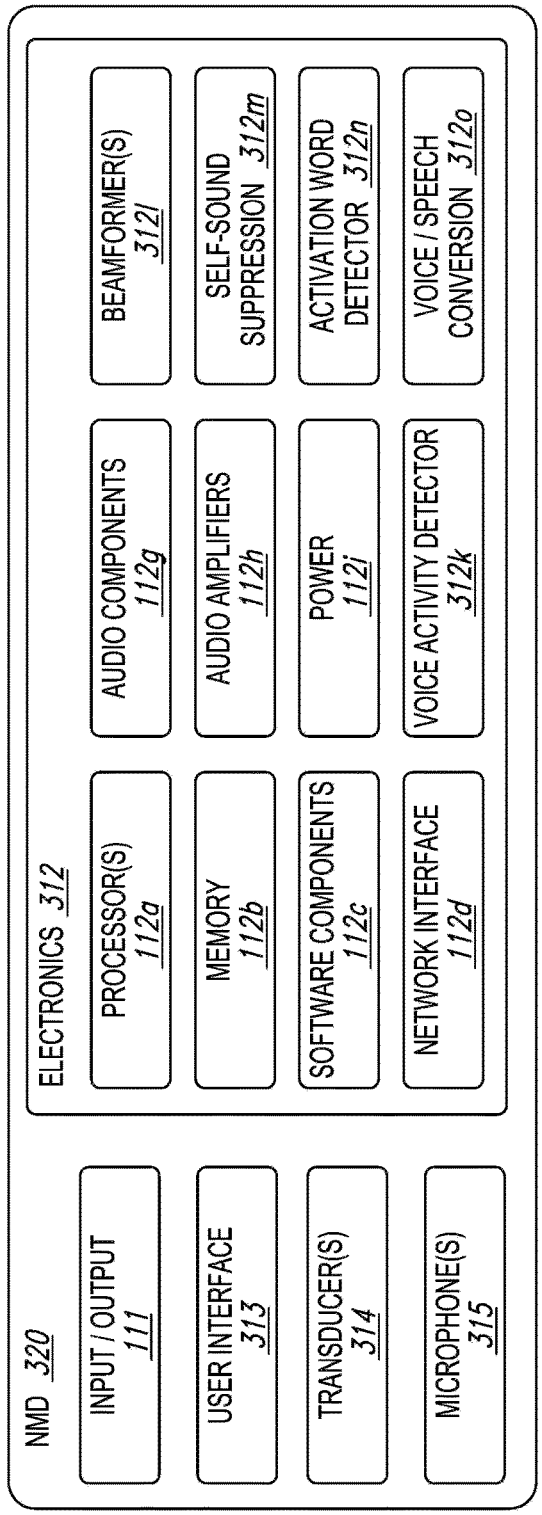
FIG. 3E shows a block diagram of the network microphone device of FIGS. 3A-3D

FIG. 3E is a functional block diagram showing additional features of the NMD 320 in accordance with aspects of the disclosure. The NMD 320 includes components configured to facilitate voice command capture including voice activity detector component(s) 312k, beam former components 312l, acoustic echo cancellation (AEC) and/or self-sound suppression components 312m, activation word detector components 312n, and voice/speech conversion components 312o (e.g., voice-to-text and text-to-voice). In the illustrated embodiment of FIG. 3E, the foregoing components 312k-312o are shown as separate components. In some embodiments, however, one or more of the components 312k-312o are subcomponents of the processors 112a.

The beamforming and self-sound suppression components 312l and 312m are configured to detect an audio signal and determine aspects of voice input represented in the detected audio signal, such as the direction, amplitude, frequency spectrum, etc. The voice activity detector activity components 312k are operably coupled with the beamforming and AEC components 312l and 312m and are configured to determine a direction and/or directions from which voice activity is likely to have occurred in the detected audio signal. Potential speech directions can be identified by monitoring metrics which distinguish speech from other sounds. Such metrics can include, for example, energy within the speech band relative to background noise and entropy within the speech band, which is measure of spectral structure. As those of ordinary skill in the art will appreciate, speech typically has a lower entropy than most common background noise.

The activation word detector components 312n are configured to monitor and analyze received audio to determine if any activation words (e.g., wake words) are present in the received audio. The activation word detector components 312n may analyze the received audio using an activation word detection algorithm. If the activation word detector 312n detects an activation word, the NMD 320 may process voice input contained in the received audio. Example activation word detection algorithms accept audio as input and provide an indication of whether an activation word is present in the audio. Many first- and third-party activation word detection algorithms are known and commercially available. For instance, operators of a voice service may make their algorithm available for use in third-party devices. Alternatively, an algorithm may be trained to detect certain activation words. In some embodiments, the activation word detector 312n runs multiple activation word detection algorithms on the received audio simultaneously (or substantially simultaneously). As noted above, different voice services (e.g. AMAZON's ALEXA®, APPLE's SIRI®, or MICROSOFT's CORTANA®) can each use a different activation word for invoking their respective voice service. To support multiple services, the activation word detector 312n may run the received audio through the activation word detection algorithm for each supported voice service in parallel.

The speech/text conversion components 312o may facilitate processing by converting speech in the voice input to text. In some embodiments, the electronics 312 can include voice recognition software that is trained to a particular user or a particular set of users associated with a household. Such voice recognition software may implement voice-processing algorithms that are tuned to specific voice profile(s). Tuning to specific voice profiles may require les s computationally intensive algorithms than traditional voice activity services, which typically sample from a broad base of users and diverse requests that are not targeted to media playback systems.

Figure 3F:
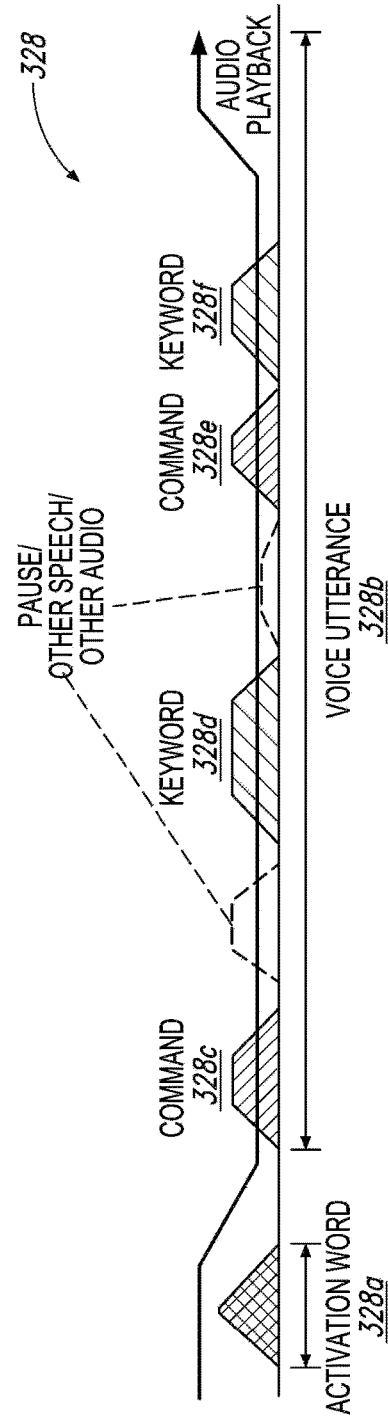
FIG. 3F shows a schematic diagram of an example voice input.

FIG. 3F is a schematic diagram of an example voice input 328 captured by the NMD 320 in accordance with aspects of the disclosure. The voice input 328 can include a activation word portion 328a and a voice utterance portion 328b. In some embodiments, the activation word 557a can be a known activation word, such as "Alexa," which is associated with AMAZON's ALEXA®. In other embodiments, however, the voice input 328 may not include a activation word. In some embodiments, a network microphone device may output an audible and/or visible response upon detection of the activation word portion 328a. In addition or alternately, an NMB may output an audible and/or visible response after processing a voice input and/or a series of voice inputs.

The voice utterance portion 328b may include, for example, one or more spoken commands (identified individually as a first command 328c and a second command 328e) and one or more spoken keywords (identified individually as a first keyword 328d and a second keyword 328f). In one example, the first command 328c can be a command to play music, such as a specific song, album, playlist, etc. In this example, the keywords may be one or words identifying one or more zones in which the music is to be played, such as the Living Room and the Dining Room shown in FIG. 1A. In some examples, the voice utterance portion 328b can include other information, such as detected pauses (e.g., periods of non-speech) between words spoken by a user, as shown in FIG. 3F. The pauses may demarcate the locations of separate commands, keywords, or other information spoke by the user within the voice utterance portion 328b.

In some embodiments, the media playback system 100 is configured to temporarily reduce the volume of audio content that it is playing while detecting the activation word portion 557a. The media playback system 100 may restore the volume after processing the voice input 328, as shown in FIG. 3F. Such a process can be referred to as ducking, examples of which are disclosed in U.S. patent application Ser. No. 15/438,749, incorporated by reference herein in its entirety.

Figure 4A:
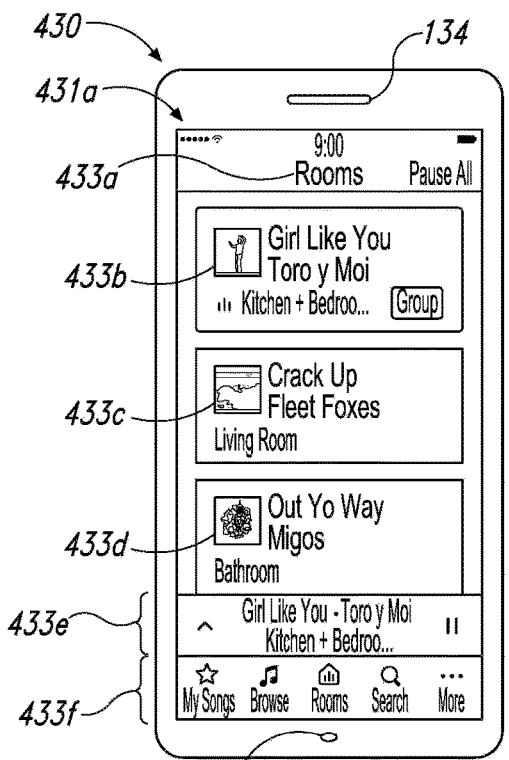
FIGS. 4A-4D show schematic diagrams of a control device in various stages of operation in accordance with aspects of the disclosed technology.
Figure 4B:
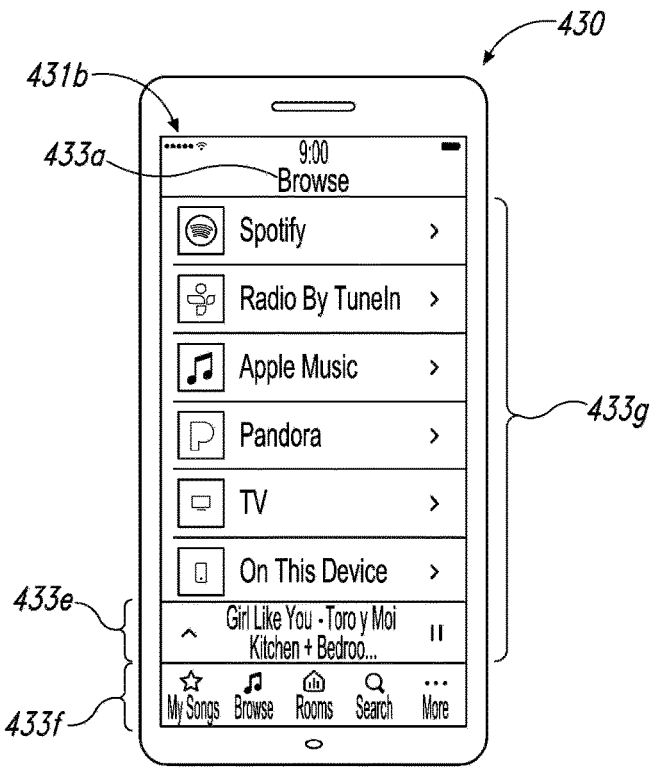
Figure 4C:
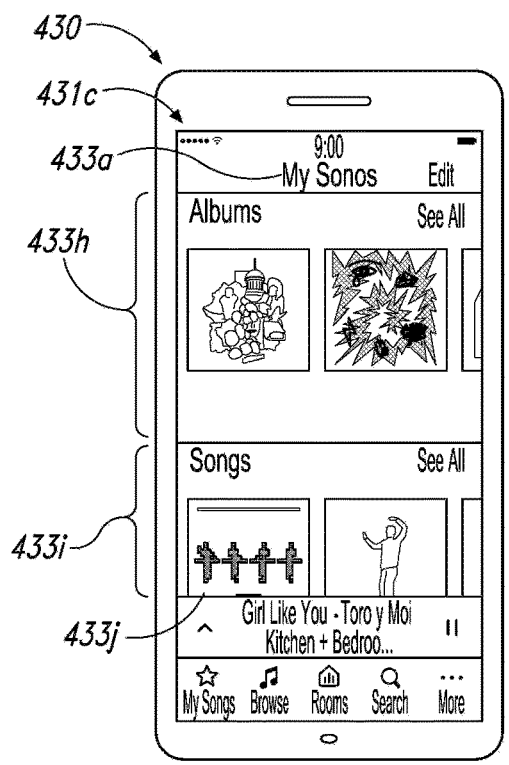
Figure 4D:
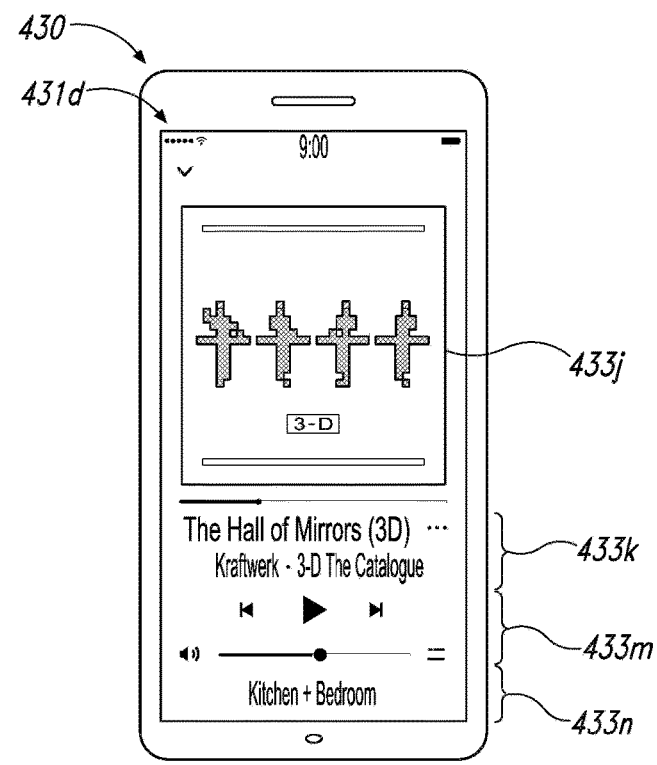

FIGS. 4A-4D are schematic diagrams of a control device 430 (e.g., the control device 130a of FIG. 1H, a smartphone, a tablet, a dedicated control device, an IoT device, and/or another suitable device) showing corresponding user interface displays in various states of operation. A first user interface display 431a (FIG. 4A) includes a display name 433a (i.e., "Rooms"). A selected group region 433b displays audio content information (e.g., artist name, track name, album art) of audio content played back in the selected group and/or zone. Group regions 433c and 433d display corresponding group and/or zone name, and audio content information audio content played back or next in a playback queue of the respective group or zone. An audio content region 433e includes information related to audio content in the selected group and/or zone (i.e., the group and/or zone indicated in the selected group region 433b). A lower display region 433f is configured to receive touch input to display one or more other user interface displays. For example, if a user selects "Browse" in the lower display region 433f, the control device 430 can be configured to output a second user interface display 431b (FIG. 4B) comprising a plurality of music services 433g (e.g., Spotify, Radio by Tunein, Apple Music, Pandora, Amazon, TV, local music, line-in) through which the user can browse and from which the user can select media content for play back via one or more playback devices (e.g., one of the playback devices 110 of FIG. 1A). Alternatively, if the user selects "My Sonos" in the lower display region 433f, the control device 430 can be configured to output a third user interface display 431c (FIG. 4C). A first media content region 433h can include graphical representations (e.g., album art) corresponding to individual albums, stations, or playlists. A second media content region 433i can include graphical representations (e.g., album art) corresponding to individual songs, tracks, or other media content. If the user selections a graphical representation 433j (FIG. 4C), the control device 430 can be configured to begin play back of audio content corresponding to the graphical representation 433j and output a fourth user interface display 431d fourth user interface display 431d includes an enlarged version of the graphical representation 433j, media content information 433k (e.g., track name, artist, album), transport controls 433m (e.g., play, previous, next, pause, volume), and indication 433n of the currently selected group and/or zone name.

Figure 5:
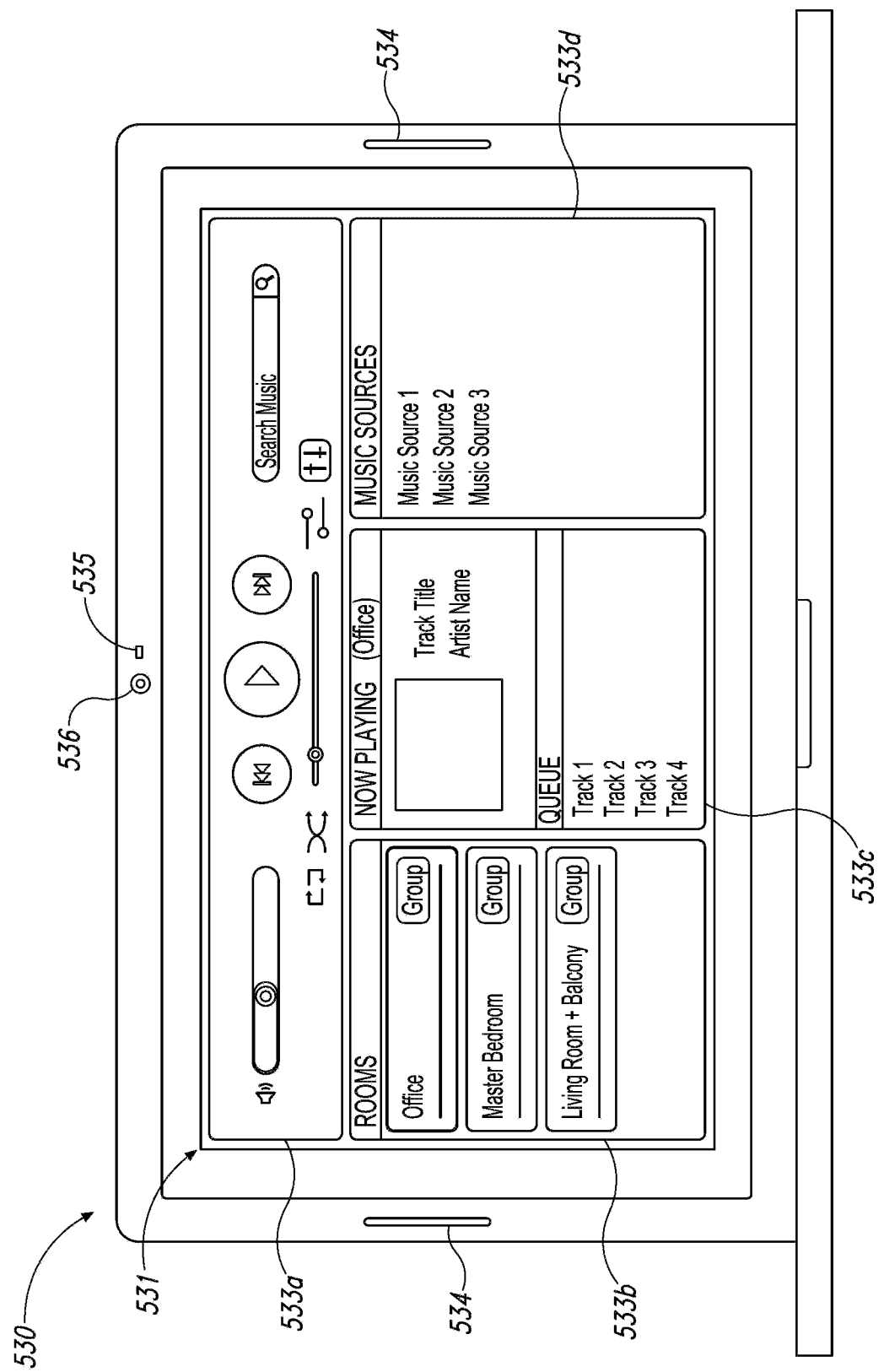
FIG. 5 shows front view of a control device.

FIG. 5 is a schematic diagram of a control device 530 (e.g., a laptop computer, a desktop computer). The control device 530 includes transducers 534, a microphone 535, and a camera 536. A user interface 531 includes a transport control region 533a, a playback status region 533b, a playback zone region 533c, a playback queue region 533d, and a media content source region 533e. The transport control region comprises one or more controls for controlling media playback including, for example, volume, previous, play/pause, next, repeat, shuffle, track position, crossfade, equalization, etc. The audio content source region 533e includes a listing of one or more media content sources from which a user can select media items for play back and/or adding to a playback queue.

The playback zone region 533b can include representations of playback zones within the media playback system 100 (FIGS. 1A and 1B). In some embodiments, the graphical representations of playback zones may be selectable to bring up additional selectable icons to manage or configure the playback zones in the media playback system, such as a creation of bonded zones, creation of zone groups, separation of zone groups, renaming of zone groups, etc. In the illustrated embodiment, a "group" icon is provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone can be configured to play audio content in synchrony with the playback device(s) in the particular zone. Analogously, a "group" icon may be provided within a graphical representation of a zone group. In the illustrated embodiment, the "group" icon may be selectable to bring up options to deselect one or more zones in the zone group to be removed from the zone group. In some embodiments, the control device 530 includes other interactions and implementations for grouping and ungrouping zones via the user interface 531. In certain embodiments, the representations of playback zones in the playback zone region 533b can be dynamically updated as playback zone or zone group configurations are modified.

The playback status region 533c includes graphical representations of audio content that is presently being played, previously played, or scheduled to play next in the selected playback zone or zone group. The selected playback zone or zone group may be visually distinguished on the user interface, such as within the playback zone region 533b and/or the playback queue region 533d. The graphical representations may include track title, artist name, album name, album year, track length, and other relevant information that may be useful for the user to know when controlling the media playback system 100 via the user interface 531.

The playback queue region 533d includes graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device. In some embodiments, for example, a playlist can be added to a playback queue, in which information corresponding to each audio item in the playlist may be added to the playback queue. In some embodiments, audio items in a playback queue may be saved as a playlist. In certain embodiments, a playback queue may be empty, or populated but "not in use" when the playback zone or zone group is playing continuously streaming audio content, such as Internet radio that may continue to play until otherwise stopped, rather than discrete audio items that have playback durations. In some embodiments, a playback queue can include Internet radio and/or other streaming audio content items and be "in use" when the playback zone or zone group is playing those items.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped.

Figure 6:
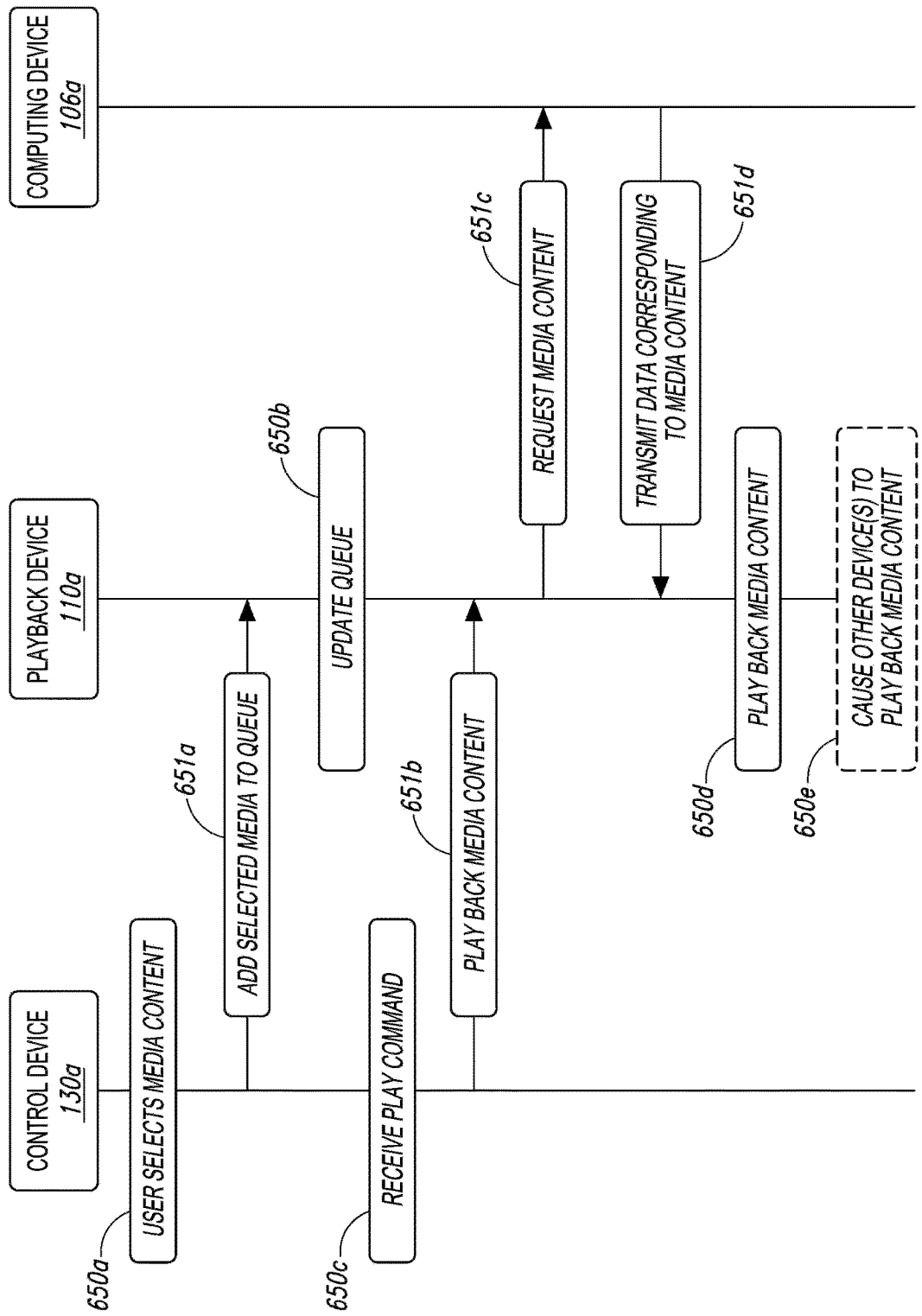
FIG. 6 shows a message flow diagram of a media playback system.

FIG. 6 is a message flow diagram illustrating data exchanges between devices of the media playback system 100 (FIGS. 1A-1M).

At step 650a, the media playback system 100 receives an indication of selected media content (e.g., one or more songs, albums, playlists, podcasts, videos, stations) via the control device 130a. The selected media content can comprise, for example, media items stored locally on or more devices (e.g., the audio source 105 of FIG. 1C) connected to the media playback system and/or media items stored on one or more media service servers (one or more of the remote computing devices 106 of FIG. 1B). In response to receiving the indication of the selected media content, the control device 130a transmits a message 651a to the playback device 110a (FIGS. 1A-1C) to add the selected media content to a playback queue on the playback device 110a.

At step 650b, the playback device 110a receives the message 651a and adds the selected media content to the playback queue for play back.

At step 650c, the control device 130a receives input corresponding to a command to play back the selected media content. In response to receiving the input corresponding to the command to play back the selected media content, the control device 130a transmits a message 651b to the playback device 110a causing the playback device 110a to play back the selected media content. In response to receiving the message 651b, the playback device 110a transmits a message 651c to the first computing device 106a requesting the selected media content. The first computing device 106a, in response to receiving the message 651c, transmits a message 651d comprising data (e.g., audio data, video data, a URL, a URI) corresponding to the requested media content.

At step 650d, the playback device 110a receives the message 651d with the data corresponding to the requested media content and plays back the associated media content.

At step 650e, the playback device 110a optionally causes one or more other devices to play back the selected media content. In one example, the playback device 110a is one of a bonded zone of two or more players (FIG. 1M). The playback device 110a can receive the selected media content and transmit all or a portion of the media content to other devices in the bonded zone. In another example, the playback device 110a is a coordinator of a group and is configured to transmit and receive timing information from one or more other devices in the group. The other one or more devices in the group can receive the selected media content from the first computing device 106a, and begin playback of the selected media content in response to a message from the playback device 110a such that all of the devices in the group play back the selected media content in synchrony.

IV. Overview of Example Embodiments

As mentioned above, when a Bluetooth audio source is connected to a first playback device in a paired configuration (e.g., a stereo pair) with a second playback device, it is desirable for the paired configuration to remain intact rather than the typical scenario where connecting the Bluetooth audio source to the first playback device causes (or otherwise results in) the first playback device leaving the paired configuration or otherwise disconnecting from the second playback device and thereby becoming unpaired from the second playback device.

In operation, when the first playback device and the second playback device are operating in the paired configuration, one of the first playback device or the second playback device is configured to operate as a stereo pair primary for the paired configuration, and the other of the first playback device or the second playback device is configured to operate as a stereo pair secondary of the paired configuration. The stereo pair primary performs functions for initiating and controlling groupwise playback of audio by the paired configuration as described herein.

In some embodiments, the playback device that sources the Bluetooth audio is configured as the stereo pair primary for the stereo pair. In some embodiments, the playback device that sources the Bluetooth audio may also be configured as the stereo pair primary (and also perhaps the group coordinator) for a synchrony group comprising the stereo pair. In some embodiments, the playback device configured as the stereo pair primary performs functions including: (i) obtaining audio content from an audio source; (ii) generating playback timing for the audio content, where the playback devices in the playback group (including the stereo pair primary) use the audio content and the playback timing to play audio based on the audio content in a groupwise fashion; (iii) playing the audio based on the audio content in synchrony with the other playback device in the paired configuration; and (iv) transmitting the audio content and the playback timing information to the other playback device(s) in the paired configuration.

In some embodiments, the stereo pair primary functions additionally include providing clock timing to the stereo pair secondary, where the playback devices in the paired configuration (including the stereo pair primary) use the clock timing, the audio content, and the playback timing to play audio based on the audio content in a groupwise fashion.

V. Technical Features

In some embodiments, at least some aspects of the technical solutions derive from the technical structure and organization of the audio content, the playback timing, and clock timing that the playback devices use to play audio from audio sources in synchrony with each other or in some other groupwise fashion, including how playback devices generate and/or use playback timing based on clock timing and play audio based on playback timing and clock timing.

Therefore, to aid in understanding certain aspects of the disclosed technical solutions, certain technical details of the audio content, playback timing, and clock timing, as well as how playback devices generate and/or use playback timing and clock timing for playing audio are described below. Except where noted, the technical details of the audio content, playback timing, and clock timing described herein are the same or substantially the same for the examples shown and described herein with reference to FIGS. 7A-B and 8A-B.

a. Audio Content

The audio content referred to herein may be any type of audio content now known or later developed. For example, in some embodiments, the audio content includes any one or more of: (i) streaming music or other audio obtained from a streaming media service, such as Spotify, Pandora, or other streaming media services; (ii) streaming music or other audio from a local music library, such as a music library stored on a user's laptop computer, desktop computer, smartphone, tablet, home server, or other computing device now known or later developed; (iii) audio content associated with video content, such as audio content associated with a television program or movie received from any of a streaming video service, or any other source of audio-visual media content now known or later developed; (iv) text-to-speech or other audible information from a voice assistant service (VAS), such as Amazon Alexa or other VAS services now known or later developed; and/or (v) audio content from a telephone, video phone, video/teleconferencing system or other application configured to allow users to communicate with each other via audio and/or video.

In some embodiments, a stereo pair primary (which may also be a group coordinator), sometimes referred to as a "sourcing" device herein, obtains any of the aforementioned types of audio content from an audio source via an interface on the sourcing device, e.g., one of the sourcing device's network interfaces, a "line-in" analog interface, a digital audio interface, a network interface (e.g., a WiFi or Bluetooth interface) or any other interface suitable for receiving audio content in digital or analog format now known or later developed. In some embodiments, the sourcing device obtains any of the aforementioned types of audio content via one or more of a Wireless Local Area Network (WLAN) interface or a Personal Area Network (PAN) link (e.g., a Bluetooth or other PAN link) from an audio source, e.g., another playback device, a smartphone, a tablet computer, a smartwatch, or other computing device now known or later developed that is suitable for providing audio content to the playback device.

An audio source is any system, device, or application that generates, provides, or otherwise makes available any of the aforementioned audio content to a sourcing device, including but not limited to a playback device, a smartphone, a tablet computer, a smartwatch, a network server, a content service provider, or other computing system or device now known or later developed that is suitable for providing audio content to a playback device.

As mentioned earlier, a playback device that receives or otherwise obtains audio content from an audio source for playback and/or distribution to another playback device in a playback group (e.g., a paired configuration, a stereo pair configuration, or any other configuration of two or more playback devices) is sometimes referred to herein as the "sourcing" device for the playback group. One function of the sourcing device of a playback group is to process received audio content for playback and/or distribution to group members of the playback group for groupwise playback.

In some embodiments, the sourcing device transmits the processed audio content to all the other group members in the playback group. In some embodiments, the sourcing device transmits the audio content to a multicast network address, and all the group members configured to play the audio (i.e., the group members of the playback group) receive the audio content via that multicast address.

In some embodiments, the sourcing device receives audio content from an audio source in digital form, e.g., via a stream of packets. In some embodiments, individual packets in the stream have a sequence number or other identifier that specifies an ordering of the packets. In operation, the sourcing device uses the sequence number or other identifier to detect missing packets and/or to reassemble the packets of the stream in the correct order before performing further processing. In some embodiments, the sequence number or other identifier that specifies the ordering of the packets is or at least comprises a timestamp indicating a time when the packet was created. The packet creation time can be used as a sequence number based on an assumption that packets are created in the order in which they should be subsequently played out.

For example, in some embodiments, individual packets from an audio source may include both a timestamp and a sequence number. The timestamp is used to place the incoming packets of audio content in the correct order, and the sequence number is mainly used to detect packet losses. In operation, the sequence numbers increase by one for each Real-time Transport Protocol (RTP) packet transmitted from the audio source, and timestamps increase by the time "covered" by an RTP packet. In instances where a portion of audio content is split across multiple RTP packets, multiple RTP packets can have the same timestamp.

In some embodiments, the sourcing device does not change the sequence number or identifier of a received packet during processing. In some embodiments, the sourcing device reorders at least a first set of packets in a first packet stream received from an audio source (an inbound stream) based on each packet's sequence identifier, extracts audio content from the received packets, reassembles a bitstream of audio content from the received packets, and then repacketizes the reassembled bitstream into a second set of packets (an outbound stream), where packets in the second set of packets have sequence numbers and/or timestamps that differ from the sequence numbers and/or timestamps of the packets in the first set of packets (or first stream). The audio content in this outbound stream is sometimes referred to herein as processed audio content.

In some embodiments, individual packets in the second stream are a different length (i.e., shorter or longer) than individual packets in the first stream. In some embodiments, reassembling a bitstream from the incoming packet stream and then subsequently repacketizing the reassembled bitstream into a different set of packets facilitates uniform processing and/or transmission of the processed audio content by the sourcing device and uniform processing by the group members that receive the processed audio content from the audio sourcing device. However, for some delay-sensitive audio content, reassembly and repacketization may be undesirable, and therefore, in some embodiments, the sourcing device may not perform reassembly and repacketization for some (or all) audio content that it receives before playing the audio and/or transmitting the audio content to other playback devices/group members.

b. Playback Timing

In some embodiments, the playback devices disclosed and described herein use playback timing to play audio in synchrony with each other. An individual playback device can generate playback timing and/or playback audio according to playback timing, based on the playback device's configuration in the playback group. The sourcing playback device (acting as a stereo pair primary and/or a group coordinator in some instances) that generates the playback timing for the processed audio content also transmits that generated playback timing to all the playback devices that are configured to play the audio content (the stereo pair secondary and/or other group members).

For example, in a paired configuration according to some embodiments, e.g., a stereo pair configuration comprising a stereo pair primary and at least one stereo pair secondary, the stereo pair primary (i) obtains the audio content from an audio source (ii) processes the audio content and generates the playback timing for the processed audio content, and (iii) transmits the processed audio content and the playback timing to the group member.

In some embodiments, the audio sourcing device (which, again, may be the stereo pair primary in a stereo pair configuration, but could alternatively be a stereo pair secondary in some configurations) transmits playback timing separately from the processed audio content. In some embodiments, the audio sourcing device transmits the playback timing to all the group members by transmitting the playback timing to a multicast network address for the playback group, and all the group members receive the playback timing via the playback group's multicast address. In some embodiments, the audio sourcing device transmits the playback timing to each group member by transmitting the playback timing to each group member's unicast network address.

In some embodiments, the playback timing is generated for individual frames (or packets) of processed audio content. As described above, in some embodiments, the processed audio content is packaged in a series of frames (or packets) where individual frames (or packets) comprise a portion of the audio content. In some embodiments, the playback timing for the audio content includes a playback time for each frame (or packet) of audio content. In some embodiments, the playback timing for an individual frame (or packet) is included within the frame (or packet), e.g., in the header of the frame (or packet), in an extended header of the frame (or packet), and/or in the payload portion of the frame (or packet).

In some embodiments, the playback time for an individual frame (or packet) is identified within a timestamp or other indication. In such embodiments, the timestamp (or other indication) represents a time to play the one or more portions of audio content within that individual frame (or packet).

In operation, when the playback timing for an individual frame (or packet) is generated, the playback timing for that individual frame (or packet) is a future time relative to a current clock time of a reference clock at the time that the playback timing for that individual frame (or packet) is generated.

In operation, a playback device tasked with playing particular audio content will play the portion(s) of the particular audio content within an individual frame (or packet) at the playback time specified by the playback timing for that individual frame (or packet), as adjusted to accommodate for differences between the clock timing and a clock at the playback device that is tasked with playing the audio content, as described in more detail below.

c. Clock Timing

The playback devices disclosed and described herein use clock timing to generate playback timing for audio content and/or to play audio based on the audio content and the generated playback timing.

In some embodiments, the audio sourcing device uses clock timing from a reference clock (e.g., a device clock, a digital-to-audio converter clock, a playback time reference clock, or any other clock) to generate playback timing for audio content that the audio sourcing device receives from an audio source. The reference clock can be a "local" clock at the audio sourcing device or a "remote" clock at a separate network device, e.g., another playback device, a computing device, or another network device configured to provide clock timing for use by (i) an audio sourcing device to generate playback timing and/or (ii) the audio sourcing device and group member(s) to play audio based on the playback timing associated with the audio content.

In some embodiments, each playback device tasked with playing particular audio content in synchrony (i.e., all the group members in a playback group, e.g., a stereo pair) use the same clock timing from the same reference clock to play back that particular audio content in synchrony with each other. In some embodiments, playback devices use the same clock timing to play audio content that was used to generate the playback timing for the audio content. The reference clock may be a local clock of the audio sourcing device, but the reference clock could also be a clock at a different device, such as a group member or a computing device (e.g., a smartphone, tablet computer, smartwatch, or other computing device).

In operation, the device that generates the clock timing also transmits the clock timing to all the playback devices that need to use the clock timing for generating playback timing and/or playing back audio. In some embodiments, the device that generates the clock timing (e.g., the audio sourcing device, which may be a stereo pair primary and/or a group coordinator in some embodiments) transmits the clock timing to a multicast network address, and all the playback devices configured to generate playback timing and/or play audio (e.g., the audio sourcing device and/or the group members) receive the clock timing via that multicast address. In some embodiments, the device that generates the clock timing alternatively transmits the clock timing to each unicast network address of each playback device in the playback group.

In some embodiments, the device that generates the clock timing for a paired configuration (including a stereo pair configuration) is the playback device configured to operate as the audio sourcing device for the playback group, which may be the stereo pair primary. And in operation, the audio sourcing device of the playback group transmits the clock timing to the group member (i.e., the other playback device in the paired configuration, e.g., a stereo pair secondary). The audio sourcing device (e.g., stereo pair primary) and the group member (e.g., stereo pair secondary) each use the clock timing and the playback timing to play audio in a groupwise manner. In some example embodiments, the audio sourcing device and the group member both use the clock timing and the playback timing to play audio in synchrony with each other. And in some embodiments, the audio sourcing device (e.g., a stereo pair primary) and the group member (e.g., a stereo pair secondary) both use the clock timing and the playback timing to play audio in a stereo pair configuration, where the stereo pair primary plays a first channel of the audio (e.g., a left channel) and the stereo pair secondary plays a second channel of the audio (e.g. a right channel).

In some embodiments, one or both of the audio sourcing device and the group member use the clock timing information to determine one or more of (i) a difference between the clock time of the audio sourcing device and the group member (and/or vice versa), (ii) a difference between the clock rate of the audio sourcing device and the group member (and/or vice versa), and (iii) whether and the extent to which the clock rate of the audio sourcing device has drifted relative to the clock rate of the group member (and/or vice versa). In some embodiments, one or both of the audio sourcing device and the group member use the determined difference between the clock times, clock rates, and/or clock drift to adjust the sample rate of the audio to be played in connection with playing the audio content in synchrony with each other.

For example, in combination with generating playback timing and adjusting playback timing described below, some embodiments additionally include using the clock timing differences to facilitate one or both of (i) dropping one or more samples of audio, e.g., not sending and/or not playing the dropped samples, thus effectively skipping those samples, and/or (ii) adding one or more samples of audio, e.g., sending samples with no content and/or injecting small periods of silence (typically less than 15-20 milliseconds) during playback. Adjusting the sample rate of the audio to be distributed and/or played based on differences in clock times, clock rates, and/or clock drift between the audio sourcing device and the group member can in some instances facilitate the synchronous playback process by helping to account for differences in the clock times, clock rates, and/or clock drift instead of or in addition to the timing offsets and timing advances described further herein in connection with generating playback timing and playing audio based on the generated playback timing.

d. Generating Playback Timing by the Audio Sourcing Device

In some embodiments, the audio sourcing device: (i) generates playback timing for audio content based on clock timing from a local clock at the audio sourcing device, and (ii) transmits the generated playback timing to the group member(s) in the playback group. In operation, when generating playback timing for an individual frame (or packet), the audio sourcing device adds a "timing advance" to the current clock time of a local clock at the audio sourcing device that the audio sourcing device is using for generating the playback timing.

In some embodiments, the "timing advance" is based on an amount of time that is greater than or equal to the sum of (i) the network transit time required for frames and/or packets comprising audio content transmitted from the audio sourcing device to arrive at the group member(s) and (ii) the amount of time required for all the group members to process received frames/packets from the audio sourcing device for playback.

In some embodiments, the audio sourcing device determines a timing advance by sending one or more test packets to the group member(s), and then receiving test response packets back from the group member(s). In some embodiments, the audio sourcing device and the group member(s) negotiate a timing advance via multiple test and response messages. In some embodiments with more than two group members, the audio sourcing device determines a timing advance by exchanging test and response messages with all of the group members, and then setting a timing advance that is sufficient for the group member having the longest total of network transmit time and packet processing time.

In some embodiments, the timing advance is less than about 50 milliseconds. In some embodiments, the timing advance is less than about 20-30 milliseconds. And in still further embodiments, the timing advance is less than about 10 milliseconds. In some embodiments, the timing advance remains constant after being determined, or at least constant for the duration of a playback session. In other embodiments, the audio sourcing device can change the timing advance in response to a request from the group member indicating that a greater timing advance is required (e.g., because the group member is not receiving packets in sufficient time to play the audio according to the playback timing) or a shorter timing advance would be sufficient (e.g., because the group member is buffering more packets comprising portions of audio content than necessary to provide consistent, reliable playback).

As described in more detail below, all the playback devices in a playback group configured to play the audio content in synchrony will use the playback timing and the clock timing to play the audio content in synchrony with each other.

e. Generating Playback Timing with Clock Timing from a Remote Clock

In some embodiments, the audio sourcing device may generate playback timing for audio content based on clock timing from a "remote" clock at another network device, e.g., another playback device, another computing device (e.g., a smartphone, tablet computer, smartwatch, or other computing device configurable to provide clock timing sufficient for use by the audio sourcing device to generate playback timing and/or playback audio). Generating playback timing based on clock timing from a remote clock at another network device is more complicated than generating playback timing based on clock timing from a local clock in embodiments where the same clock timing is used for both (i) generating playback timing and (ii) playing audio based on the playback timing.

In embodiments where the audio sourcing device generates playback timing for audio content based on clock timing from a remote cock, the playback timing for an individual frame (or packet) is based on (i) a "timing offset" between (a) a local clock at the audio sourcing device that the audio sourcing device uses for generating the playback timing and (b) the clock timing from the remote reference clock, and (ii) a "timing advance" based on an amount of time that is greater than or equal to the sum of (a) the network transit time required for packets transmitted from the audio sourcing device to arrive at the group member(s) and (b) the amount of time required for the group member(s) to process frames and/or packets comprising audio content received from the audio sourcing device for playback.

For an individual frame (or packet) containing a portion(s) of the audio content, the audio sourcing device generates playback timing for that individual frame (or packet) by adding the sum of the "timing offset" and the "timing advance" to a current time of the local clock at the audio sourcing device that the audio sourcing device uses to generate the playback timing for the audio content. In operation, the "timing offset" may be a positive or a negative offset, depending on whether the local clock at the audio sourcing device is ahead of or behind the remote clock providing the clock timing. The "timing advance" is a positive number because it represents a future time relative to the local clock time, as adjusted by the "timing offset."

By adding the sum of the "timing advance" and the "timing offset" to a current time of the local clock at the audio sourcing device that the audio sourcing device is using to generate the playback timing for the audio content, the audio sourcing device is, in effect, generating the playback timing relative to the remote clock.

In some embodiments, and as described above, the "timing advance" is based on an amount of time that is greater than or equal to the sum of (i) the network transit time required for frames and/or packets comprising audio content transmitted from the audio sourcing device to arrive at the group member(s) and (ii) the amount of time required for the group member(s) to process received frames/packets from the sourcing playback device for playback.

In some embodiments, the audio sourcing device determines a timing advance via signaling between the audio sourcing device and the group member(s), as described previously. Further, in some embodiments, the timing advance is less than about 50 milliseconds, less than about 20-30 milliseconds, or less than about 10 milliseconds, depending on the audio playback latency requirements because different audio may have different latency requirements.

For example, audio associated with video content may have lower latency requirements than audio that is not associated with video content because audio associated with video content must be synchronized with its corresponding video content whereas audio that is not associated with video content need not be synchronized with any corresponding video content. In some embodiments, the timing advance remains constant after being determined, or at least constant for the duration of a playback session. And in some embodiments, the audio sourcing device can change the timing advance based on further signaling between the audio sourcing device (generating the playback timing) and the group member(s) using the playback timing to play audio.

As described in more detail below, all the playback devices configured to play the audio content in synchrony will use the playback timing and the clock timing to play the audio content in synchrony with each other.

f. Playing Audio Using Local Playback Timing and Local Clock Timing

In some embodiments, the audio sourcing device is configured to play audio in synchrony with one or more group members. And if the audio sourcing device is using clock timing from a local clock at the audio sourcing device to generate the playback timing, then the audio sourcing device will play the audio using locally-generated playback timing and the locally-generated clock timing. In operation, the audio sourcing device plays an individual frame (or packet) comprising portions of the audio content when the local clock that the audio sourcing device used to generate the playback timing reaches the time specified in the playback timing for that individual frame (or packet).

For example, recall that when generating playback timing for an individual frame (or packet), the audio sourcing device adds a "timing advance" to the current clock time of the reference clock used for generating the playback timing. In this instance, the reference clock used for generating the playback timing is a local clock at the audio sourcing device. So, if the timing advance for an individual frame is, for example, 30 milliseconds, then the audio sourcing device plays the portion (e.g., a sample or set of samples) of audio content in an individual frame (or packet) 30 milliseconds after creating the playback timing for that individual frame (or packet).

In this manner, the audio sourcing device plays audio based on the audio content by using locally-generated playback timing and clock timing from a local reference clock at the audio sourcing device. As described further below, by playing the portion(s) of the audio content of an individual frame and/or packet when the clock time of the local reference clock reaches the playback timing for that individual frame or packet, the audio sourcing device plays that portion(s) of the audio corresponding to the audio content in that individual frame and/or packet in synchrony with the group member(s).

g. Playing Audio Using Local Playback Timing and Remote Clock Timing

As mentioned earlier, in some embodiments, a audio sourcing device generates playback timing for audio content based on clock timing from a remote clock, i.e., a clock at another network device separate from the audio sourcing device, e.g., another playback device, or another computing device (e.g., a smartphone, laptop, media server, or other computing device configurable to provide clock timing sufficient for use by a playback device generate playback timing and/or playback audio). Because the audio sourcing device used clock timing from the "remote" clock to generate the playback timing for the audio content, the audio sourcing device also uses the clock timing from the "remote" clock to play the audio. In this manner, the audio sourcing device plays audio using the locally-generated playback timing and the clock timing from the remote clock.

Recall that, in embodiments where the audio sourcing device generates playback timing for audio content based on clock timing from a remote clock, the audio sourcing device generates the playback timing for an individual frame (or packet) based on (i) a "timing offset" based on a difference between (a) a local clock at the audio sourcing device and (b) the clock timing from the remote clock, and (ii) a "timing advance" comprising an amount of time that is greater than or equal to the sum of (a) the network transit time required for frames/packets transmitted from the audio sourcing device to arrive at the group member(s) and (b) the amount of time required for the group member(s) to process frames and/or packets comprising audio content (i.e., processed audio content) received from the audio sourcing device for playback. And further recall that the audio sourcing device transmits the generated playback timing to the group member(s) tasked with playing the audio in synchrony.

In this scenario, to play an individual frame (or packet) of audio content in synchrony with the group member(s), the audio sourcing device subtracts the "timing offset" from the playback timing for that individual frame (or packet) to generate a "local" playback time for playing the audio based on the audio content within that individual frame (or packet). After generating the "local" playback time for playing the portion(s) of the audio corresponding to the audio content within the individual frame (or packet), the audio sourcing device plays the portion(s) of the audio corresponding to the audio content in the individual frame (or packet) when the local clock that the audio sourcing device is using to play the audio content reaches the "local" playback time for that individual frame (or packet). By subtracting the "timing offset" from the playback timing to generate the "local" playback time for an individual frame, the audio sourcing device effectively plays the portion(s) of audio corresponding to the audio content in that frame/packet with reference to the clock timing from the remote clock.

h. Playing Audio Using Remote Playback Timing and Local Clock Timing

Recall that, in some embodiments, the audio sourcing device transmits the audio content and the playback timing for the audio content to the group member(s). If the group member that receives (i.e., the receiving group member) the audio content and playback timing from the audio sourcing device is the same group member that provided clock timing to the audio sourcing device that the audio sourcing device used for generating the playback timing, then the receiving group member in this instance plays audio using the audio content and playback timing received from the audio sourcing device (i.e., remote playback timing) and the group member's own clock timing (i.e., local clock timing).

Because the audio sourcing device used clock timing from a clock at the receiving group member to generate the playback timing, the receiving group member also uses the clock timing from its local clock to play the audio. In this manner, the receiving group member plays audio using the remote playback timing (i.e., from the audio sourcing device) and the clock timing from its local clock (i.e., its local clock timing).

To play an individual frame (or packet) of the audio content in synchrony with the audio sourcing device (and any other playback device that receives the playback timing from the audio sourcing device and clock timing from the receiving group member), the receiving group member (i) receives the frames (or packets) comprising the portions of the audio content from the audio sourcing device, (ii) receives the playback timing for the audio content from the audio sourcing device (e.g., in the frame and/or packet headers of the frames and/or packets comprising the portions of the audio content or perhaps separately from the frames and/or packets comprising the portions of the audio content), and (iii) plays the portion(s) of the audio content in the individual frame (or packet) when the local clock that the receiving group member used to generate the clock timing reaches the playback time specified in the playback timing for that individual frame (or packet) received from the audio sourcing device.

Because the audio sourcing device uses the "timing offset" (which is the difference between the clock timing at the receiving group member and the clock timing at the audio sourcing device in this scenario) when generating the playback timing, and because this "timing offset" already accounts for differences between timing at the audio sourcing device and the receiving group member, the receiving group member in this scenario plays individual frames (or packets) comprising portions of the audio content when the receiving group member's local clock (that was used to generated the clock timing) reaches the playback time for an individual frame (or packet) specified in the playback timing for that individual frame (or packet).

And because the receiving group member plays frames (or packets) comprising portions of the audio content according to the playback timing, and because the audio sourcing device plays the same frames (or packets) comprising portions of the audio content according to the playback timing and the determined "timing offset," the receiving group member and the audio sourcing device play the same frames (or packets) comprising audio content corresponding to the same portions of audio in synchrony, i.e., at the same time or at substantially the same time.

i. Playing Audio Using Remote Playback Timing and Remote Clock Timing

Recall that, in some embodiments, the audio sourcing device (e.g., which in some cases may be the group coordinator) transmits the audio content and the playback timing for the audio content to the group member playback device(s) in the playback group. And further recall that, in some embodiments, the network device providing the clock timing can be a different device than the playback device providing the audio content and playback timing (i.e., the audio sourcing device, which in some cases may be the group coordinator). A playback device that receives the audio content, the playback timing, and the clock timing is configured to play the audio using the playback timing from the device that provided the playback timing (i.e., remote playback timing) and clock timing from a clock at the device that provided the clock timing (i.e., remote clock timing). In this manner, the receiving group member in this instance plays audio based on audio content by using remote playback timing and remote clock timing.

To play an individual frame (or packet) of the audio content in synchrony with the other playback device(s) tasked with playing audio in the playback group, the receiving playback device (i) receives the frames (or packets) comprising the portions of the audio content, (ii) receives the playback timing for the audio content (e.g., in the frame and/or packet headers of the frames and/or packets comprising the portions of the audio content or perhaps separately from the frames and/or packets comprising the portions of the audio content), (iii) receives the clock timing, and (iv) plays the portion(s) of the audio content in the individual frame (or packet) when the local clock that the receiving playback device uses for audio playback reaches the playback time specified in the playback timing for that individual frame (or packet), as adjusted by a "timing offset."

In operation, after the receiving playback device receives clock timing, the receiving playback device determines a "timing offset" for the receiving playback device. This "timing offset" comprises (or at least corresponds to) a difference between the "reference" clock that was used to generate the clock timing and a "local" clock at the receiving playback device that the receiving playback device uses to play the audio content. In operation, a playback device that receives the clock timing from another device calculates its own "timing offset" based on the difference between its local clock and the clock timing, and thus, the "timing offset" that each playback device determines is specific to that particular playback device.

In some embodiments, when playing audio, the receiving playback device generates new playback timing (specific to the receiving playback device) for individual frames (or packets) of audio content by adding the previously determined "timing offset" to the playback timing for each received frame (or packet) comprising portions of audio content. With this approach, the receiving playback device converts the playback timing for the received audio content into "local" playback timing for the receiving playback device. Because each receiving playback device calculates its own "timing offset," each receiving playback device's determined "local" playback timing for an individual frame is specific to that particular playback device.

And when the "local" clock that the receiving playback device is using for playing back the audio reaches the "local" playback time for an individual frame (or packet), the receiving playback device plays the audio content (or portions thereof) associated with that individual frame (or packet). As described above, in some embodiments, the playback timing for a particular frame (or packet) is in the header of the frame (or packet). In other embodiments, the playback timing for individual frames (or packets) is transmitted separately from the frames (or packets) comprising the audio content.

Because the receiving playback device plays frames (or packets) comprising portions of the audio content according to the playback timing as adjusted by the "timing offset" relative to the clock timing, and because the device providing the playback timing generated the playback timing for those frames (or packets) relative to the clock timing and (if applicable) plays the same frames (or packets) comprising portions of the audio content according to the playback timing and its determined "timing offset," the receiving playback device and the audio sourcing device that provided the playback timing (e.g., the group coordinator in some embodiments) play the same frames (or packets) comprising the same portions of the audio content in synchrony with each other, i.e., at the same time or at substantially the same time.

VI. Example Embodiments

The example embodiments described herein include playback devices configured to, among other features, maintain a paired configuration (including a stereo pair configuration) between a first playback device and a second playback device even after connecting a Bluetooth audio source (or other audio source) to one of the first playback device or the second playback device which would cause a typical playback device to leave the paired configuration.

Figure 7A:
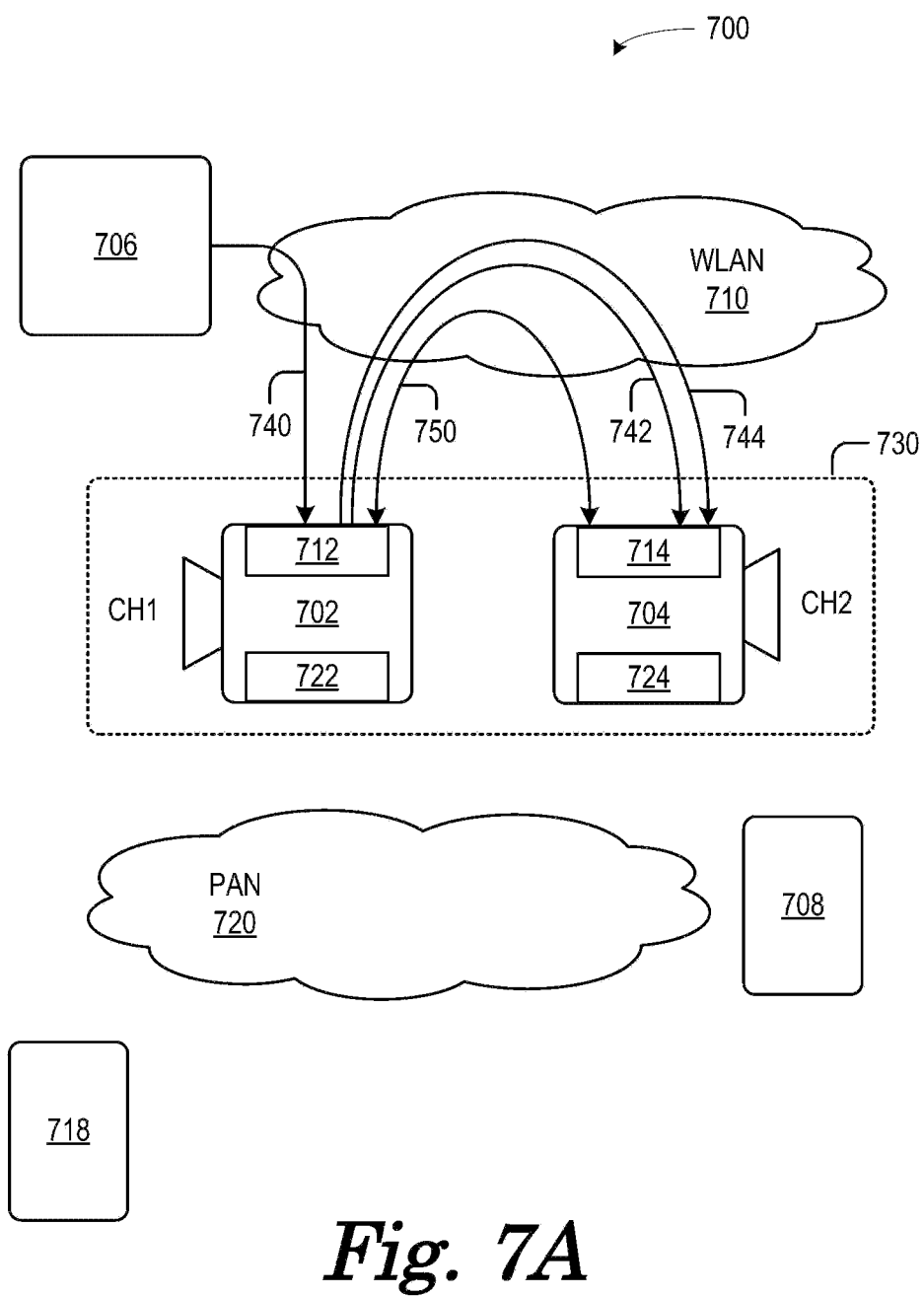
FIG. 7A shows an example configuration of a media playback system comprising two playback devices configured in a stereo pair configuration according to some embodiments before connecting a Bluetooth audio source to the stereo pair configuration.

FIG. 7A shows an example configuration of a media playback system comprising two playback devices 702, 704 configured in a stereo pair configuration 730 according to some embodiments before connecting a Bluetooth audio source 708 to the stereo pair configuration 730.

The media playback system 700 includes playback devices 702 and 704. The playback devices 702 and 704 may be the same as or similar to any of the playback devices (and/or networked microphone devices) disclosed and described herein except that playback devices 702 and 704 are generally portable and can be powered via a standard electrical wall outlet or via rechargeable batteries.

Similar to other playback devices (and networked microphone devices) described herein, playback device 702 includes network interface 712 configured to facilitate communication via Wireless Local Area Network (WLAN) 710 and network interface 722 configured to facilitate communication via Personal Area Network (PAN) 720. Playback device 702 also includes one or more processors and tangible, non-transitory computer-readable media storing program instructions that are executable by the one or more processors to cause the playback device 702 to perform at least some (or perhaps all) of the playback device functions disclosed and described herein.

Likewise, playback device 704 includes network interface 714 configured to facilitate communication via WLAN 710 and interface 724 configured to facilitate communication via PAN 720. Like playback device 702, playback device 704 also includes one or more processors and tangible, non-transitory computer-readable media storing program instructions that are executable by the one or more processors to cause the playback device 704 to perform at least some (or perhaps all) of the playback device functions disclosed and described herein.

In the example shown in FIG. 7A, playback device 702 and playback device 704 are configured in a stereo pair configuration 730 where playback device 702 plays a first channel (CH1) of stereo content and playback device 704 plays a second channel (CH2) of stereo content. In stereo pair configuration 730, playback device 702 is configured to function as the stereo pair primary for the stereo pair configuration 730 (and perhaps also the group coordinator), and playback device 704 is configured to function as the stereo pair secondary (i.e., a group member) for the stereo pair configuration 730.

However, in other embodiments, configuration 730 may represent another type of paired configuration. For example, in some embodiments, configuration 730 may represent a paired configuration where playback device 702 and playback device 704 each play both channels of the stereo content. In still further embodiments, configuration 730 may represent a paired configuration where playback device 702 and playback device 704 play different channels of audio content other than stereo content, such as different channels of other multi-channel content like surround sound content or other types of multichannel audio content now known or later developed.

In the example shown in FIG. 7A, playback device 702 and playback device 704 are the same type of playback device (e.g., the same "model" playback device). However, in other examples, playback device 702 and playback device 704 may be different types of playback devices. Although not required, it is often desirable for both playback devices in a stereo pair configuration to be the same type (or model) of playback device so that volume and equalization settings can be applied to the stereo pair configuration in a groupwise manner and that stereo audio output from the stereo pair configuration is consistent between the different channels played by the different playback devices. In scenarios where a stereo pair configuration includes two different types (or models) of playback devices, volume and equalization settings may need to be tailored to each playback device to improve the likelihood that the two different channels played by the two different playback devices in the stereo pair configuration have a consistent sounding output from each playback devices. For example, it would be generally undesirable for one channel played by one of the playback devices to be louder (or softer) than the other channel played by the other playback device, or for one of the channels to have a different sounding output because of different speakers not being equalized to have a consistent sounding output.

While in stereo pair configuration 730, playback device 702 and playback device 704 exchange clock timing information 750 with each other to facilitate groupwise playback of audio while in the stereo pair configuration 730. Exchanging the clock timing information 750 includes one or both of (i) playback device 702 providing one or more indications of its clock timing and/or clock rate to playback device 704 and/or (ii) playback device 704 providing one or more indications of its clock timing and/or clock rate to playback device 702. In some embodiments, the playback device 702 and playback device 704 exchange clock information 750 on a regular, semi-regular, and/or on-going basis throughout the timeframe during which playback device 702 and playback device 704 are in the stereo pair configuration 730.

The clock timing information 750 that playback devices 702 and 704 exchange with each other is the same as or similar to any of the clock timing information disclosed and described herein. For example, and as described previously, playback devices in a paired configuration exchange clock timing information 750 for several purposes relating to synchronized playback, including but not limited to one or more of determining timing offsets relative to each other, determining a timing advance for generating clock timing, determining differences between clock times, clock rates, and/or clock drifts, and any of the other synchronized playback related functions involving the exchange of clock timing information disclosed and described herein.

The example configuration shown in FIG. 7A also includes audio source 706. Audio source 706 can be the same as or similar to any of the audio sources disclosed and described herein. For example, audio source 706 may correspond to an online content streaming service (e.g., an audio content service, a video content service, and so on), a content server, another playback device, or any other audio source now known or later developed that is suitable for providing audio content to playback devices.

In operation, playback device 702 uses WLAN interface 712 to obtain audio content 740 from audio source 706 via WLAN 710. In the example shown in FIG. 7A, the audio content 740 is streamed from audio source 706 to playback device 702 via WLAN 710.

Playback device 702 processes audio content 740 streamed from audio source 706 to generate processed audio content 742 and playback timing 744 associated with processed audio content 742 according to any of the audio processing and playback timing generation methods disclosed and described herein. For example, and as described in detail above, processing the audio content 740 includes the playback device 702 packaging the audio content 740 into a series of frames/packets, where individual frames/packets of audio content include corresponding playback timing 744 that is used by the playback device 702 and playback device 704 to play the audio based on the audio content 740 in a groupwise fashion.

FIG. 7A shows playback device 702 and playback device 704 exchanging the clock timing information 750 via the WLAN 710. FIG. 7A also shows playback device 702 transmitting the processed audio content 742 and the playback timing 744 to playback device 704 via WLAN 710. However, in some embodiments, playback device 702 and playback device 704 may exchange the clock timing information 750 directly with each other via WiFi transmissions (or other wireless transmissions) without traversing any routers, access points, switches, hubs, or other network infrastructure comprising the WLAN 710. Similarly, in some embodiments, playback device 702 may transmit the processed audio content 742 and playback timing 744 directly to playback device 704 via WiFi transmissions (or other wireless transmissions) without traversing any routers, access points, switches, hubs, or other network infrastructure of the WLAN 710.

In the example stereo pair configuration 730 shown in FIG. 7A, playback device 702 is configured to play a first channel of audio based on the audio content and the playback timing 744 in synchrony with the second playback device 704 playing a second channel of the audio based on the audio content and the playback timing 744 according to any of the audio playback methods based on clock timing, audio content, and playback timing disclosed and described herein. Similarly, while in stereo pair configuration 730, playback device 704 is configured to play a second channel of the audio based on the audio content extracted from the processed audio content 742 and the playback timing 744 in synchrony with the first playback device 702 playing the first channel of the audio based on the audio content and the playback timing 744 according to any of the audio playback methods based on clock timing, audio content, and playback timing disclosed in the scribed herein.

Figure 7B:
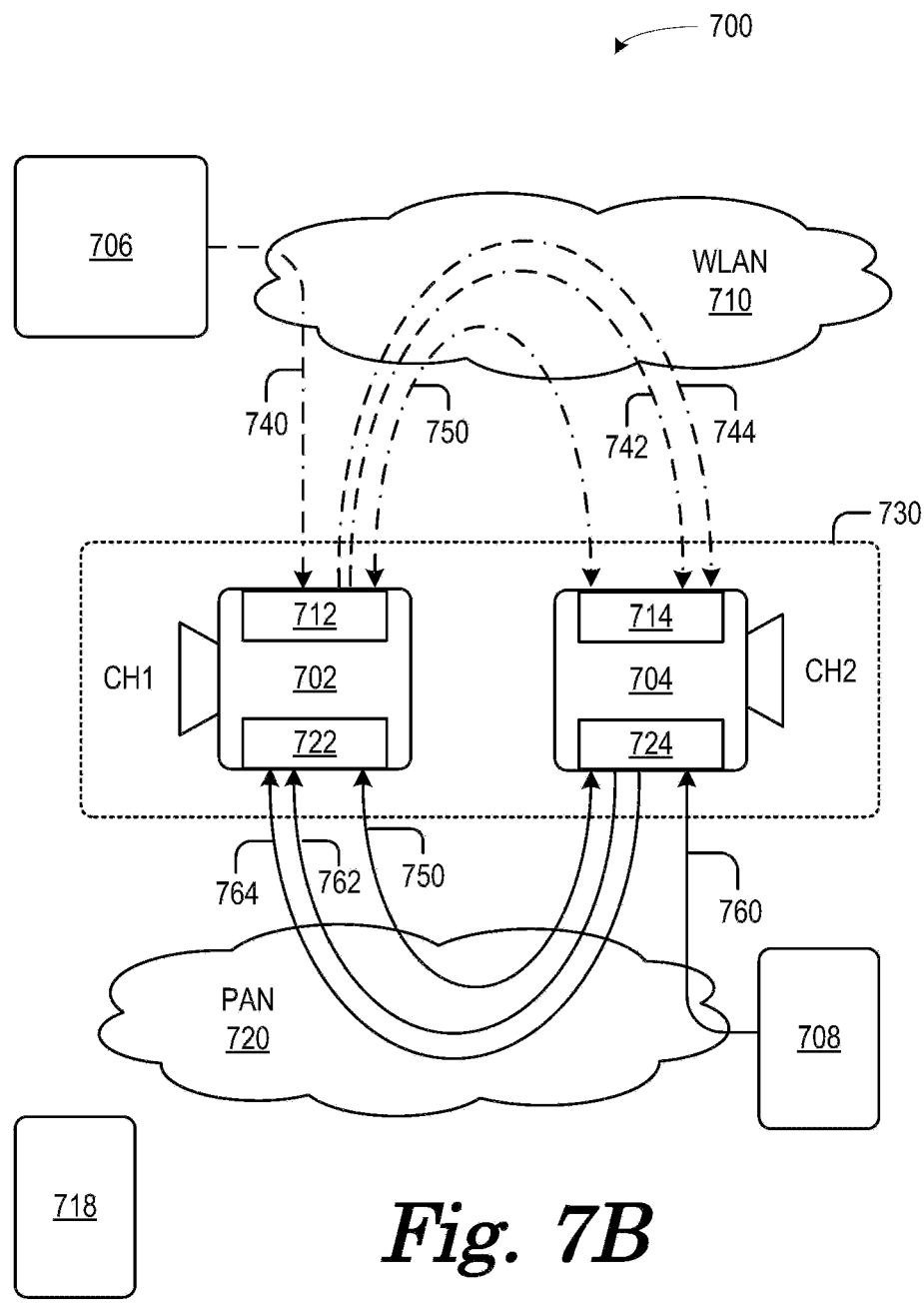
FIG. 7B shows an example configuration of a media playback system comprising two playback devices configured in a stereo pair configuration according to some embodiments after connecting a Bluetooth audio source to the stereo pair configuration.

FIG. 7B shows the stereo pair configuration 730 after audio source 708 is connected to playback device 704. Playback device 702 and playback device 704 shown in FIG. 7B are the same playback devices 702, 704 shown in described with reference to FIG. 7A.

After audio source 708 is connected to playback device 704 via interface 724, the stereo pair configuration 730 ceases playback of the audio content 740 received from the audio source 706 and begins playback of audio content 760 received from audio source 708. In the example embodiment shown in FIG. 7B, the stereo pair configuration 730 ceases playback of the audio content 740 received from the audio source 706 because playback device 702 ceases generating and transmitting processed audio content 742 and playback timing 744 to playback device 704 via WLAN 710, as indicated by the dotted signal flow lines in FIG. 7B.

In some embodiments, after audio source 708 is connected to playback device 704 via interface 724, playback device 704 exchanges one or more control signaling messages with playback device 702, thereby causing playback device 702 to facilitate transitioning the stereo pair primary role (and/or group coordinator role) from playback device 702 to playback device 704.

In the example scenario shown in FIG. 7B, audio source 708 comprises a Bluetooth audio source and PAN 720 comprises one or more Bluetooth communications channels or links.

Unlike typical playback devices, connecting audio source 708 to playback device 704 via interface 724 does not cause playback device 704 to leave the stereo pair configuration 730 with playback device 702. Instead, in contrast to typical playback devices configurable for paired operation (including but not limited to stereo pair configurations), the stereo pair configuration 730 comprising playback device 702 and playback device 704 remains intact after connecting audio source 708 to playback device 704.

After connecting audio source 708 to playback device 704, playback device 702 and playback device 704 remain configured in a stereo pair configuration 730 where playback device 702 plays a first channel (CH1) of stereo content and playback device 704 plays a second channel (CH2) of stereo content. In stereo pair configuration 730, playback device 702 becomes the stereo pair primary (and also perhaps the group coordinator) for the stereo pair configuration 730, and playback device 704 becomes a stereo pair secondary (group member) in the stereo pair configuration 730. However, if audio source 708 had been connected to playback device 702 rather than playback device 704, then playback device 704 would have remained the stereo pair primary and playback device 702 would have remained the stereo pair secondary. But regardless of which playback device audio source 708 connects to, connecting the audio source 708 to either playback device 702, 704 in the stereo pair configuration 730 does not cause either playback device 702, 704 to leave the stereo pair configuration 730.

In operation, after audio source 708 is connected to playback device 704, playback device 704 uses interface 724 to obtain audio content 760 from audio source 708 via PAN 720. In the example shown in FIG. 7B, the audio content 760 is streamed from audio source 708 to playback device 704 via PAN 720.

Playback device 704 processes audio content 760 streamed from audio source 708 to generate processed audio content 762 and playback timing 764 associated with processed audio content 762 according to any of the audio processing and playback timing generation methods disclosed and described herein. For example, and as described in detail above, processing the audio content 760 includes the playback device 704 packaging the audio content 760 into a series of frames/packets, where individual frames/packets of audio content 760 (i.e., the processed audio content 762) include corresponding playback timing 764 that is used by the playback device 702 and playback device 704 to play audio based on the audio content 760 in a groupwise fashion.

FIG. 7B also shows playback device 702 and playback device 704 exchanging their clock timing information 750 via the PAN 720. As mentioned above, in some embodiments, the playback device 702 and playback device 704 exchange clock information 750 on a regular, semi-regular, and/or on-going basis throughout the timeframe during which the playback device 702 and playback device 704 are in the stereo pair configuration 730. FIG. 7B also shows playback device 704 transmitting the processed audio content 762 and the playback timing 764 to playback device 702 via PAN 720.

However, in some embodiments, playback device 702 and playback device 704 may exchange their clock timing information 750 directly with each other via other wireless transmissions separate from PAN 720. Similarly, in some embodiments, playback device 704 may transmit the processed audio content 762 and playback timing 764 to playback device 702 via wireless transmissions separate from PAN 720.

For example, in some alternative embodiments not shown in FIG. 7B, playback device 704 receives the audio content 760 at interface 724 from audio source 708 via PAN 720. And then playback device 704 generates and then transmits processed audio content 762 and playback timing 764 to playback device 702 via WLAN 710. But in the example shown in FIG. 7B, the clock timing information 750, processed audio content 762, and playback timing 764 are all transmitted via the PAN 720.

Similarly, in some embodiments, the first playback device 702 and the second playback device 704 are configured to exchange control information with each other via one or both of the WLAN 710 and the PAN 720. In some embodiments, the first playback device 702 and the second playback device 704 are configured to exchange control information with each other via the WLAN 710 even when the clock timing information 750, processed audio content 762, and playback timing 764 are all transmitted via the PAN 720. In other embodiments, the first playback device 702 and the second playback device 704 are configured to exchange control information with each other via the PAN 720 when the clock timing information 750, processed audio content 762, and playback timing 764 are all transmitted via the PAN 720. In still further alternative embodiments, one or more of the control information, clock timing information 750, processed audio content 762, and playback timing 764, is transmitted via the PAN 720 while the other of the control information, clock timing information 750, processed audio content 762, and playback timing 764, that is not transmitted via the PAN 720 is instead transmitted via the WLAN 710 (or vice versa).

In the example stereo pair configuration 730 shown in FIG. 7B, playback device 702 is configured to play the first channel of audio content 760 (contained within processed audio content 762) based on the playback timing 764 in synchrony with the second playback device 704 playing the second channel of the audio content 760 (contained with processed audio content 762) based on the playback timing 764 according to any of the audio playback methods based on clock timing, audio content, and playback timing disclosed and described herein.

Similarly, while in stereo pair configuration 730, playback device 704 is configured to play a second channel of the audio content 760 (contained within processed audio content 762) based on the playback timing 764 in synchrony with the first playback device 702 playing the first channel of the audio content 760 based on playback timing 764 according to any of the audio playback methods based on clock timing, audio content, and playback timing disclosed in the scribed herein.

In other embodiments, playback device 704 may be configured to play the first channel while playback device 702 is configured to play the second channel. However, it is advantageous for the playback devices 702, 704 in the stereo pair configuration 730 to maintain the same channel playback configuration (i.e., playback device 702 plays the first channel and playback device 704 plays the second channel) regardless of whether the playback devices 702, 704 in the stereo pair configuration 730 are playing audio content 740 from audio source 706 or audio content 760 from audio source 708.

In some embodiments, after audio source 708 is connected to playback device 704, playback device 704 is additionally configured to (i) forward control commands received via PAN 720 to playback device 702, (ii) forward metadata received via PAN 720 to playback device 702, and (iii) execute control commands received from playback device 702 via PAN 720. In some embodiments, playback device 704 forwards control commands and/or metadata to playback device 702 via PAN 720. In other embodiments, playback device 704 forwards control commands and/or metadata to playback device 702 via a wireless transmissions separate from PAN 720 (e.g., WiFi transmissions via WLAN 710 or other wireless transmissions).

For example, in some embodiments, if playback device 704 receives a command from audio source 708 (e.g., when audio source 708 is a smartphone streaming audio content 760 to playback device 704) to change the playback volume (i.e., to increase the volume, decrease the volume, or mute the volume), playback device 704 may one or both (i) process and execute the command from the audio source 708 and then generate and transmit an associated command to playback device 702 to effectuate the command received from the audio source 708 and/or (ii) forward the command received from the audio source 708 to playback device 702 for processing and execution.

Similarly, in some embodiments, if playback device 704 receives metadata corresponding to the audio content 760 (e.g., album name, song name, artist, album cover art, genre, or any other metadata), playback device 704 forwards some (or all) of the received metadata to playback device 702. When both playback device 702 and playback device 704 have the metadata corresponding to the audio content 760, then any computing device that queries playback device 702 or playback device 704 can obtain information about the audio content 760 based on the metadata, including but not limited to the metadata itself.

Further, in some embodiments, if playback device 702 receives a control command (e.g., a command to pause playback or a command to adjust the volume) from either a manual input on the playback device 702 (e.g., a switch, button, control surface, or other control input) or software input from a computing device connected to the playback device 702, then playback device 702 may one or both (i) process and execute the command and then generate and transmit an associated command to playback device 704 to effectuate the received command and/or (ii) forward the received command to playback device 704 for processing and execution.

In some embodiments where the playback device 702 and playback device 704 may have been members of a larger playback group with one or more other playback devices (not shown), connecting audio source 708 to playback device 704 also causes playback device 702 and playback device 704 to leave that larger playback group, but still maintain the stereo pair configuration 730. In such embodiments, leaving the larger playback group prevents the audio content 760 from being played by other playback devices in the larger playback group.

In some embodiments, while the playback device 704 and playback device 702 are playing the audio content 760 from audio source 708 in the stereo pair configuration 730, playback device 704 monitors the status of communications via the PAN 720 between the playback device 702 and playback device 704. If playback device 704 determines that it can no longer communicate with playback device 702 via PAN 720 after some period of time during which the playback device 702 and playback device 704 were able to reliably exchange communications via PAN 720, playback device 704: (i) ceases transmitting the processed audio content 762 and playback timing 764 to playback device 702 via PAN 720, and (ii) switches from playing the second channel of the audio content 760 in groupwise fashion with playback device 702 to instead playing both the first channel of the second channel of the audio content 760. Playback device 704 may not be able to communicate (or reliably communicate) with playback device 702 in situations where (i) playback device 702 has run out of battery power and/or been powered down, (ii) playback device 702 has moved out of wireless radio range of playback device 704, and/or (iii) radio interference prevents reliable communications between playback device 702 and playback device 704.

Some embodiments further include, after determining that playback device 704 can communicate with playback device 702 via PAN 720 again following some period of time during which playback device 704 could not communicate with playback device 702 via PAN 720, playback device 704 (i) resumes transmitting the processed audio content 762 and playback timing 764 to playback device 702 via the PAN 720, and (ii) resumes playback of the second channel of the audio content 760 in the groupwise fashion with playback device 702 based on the playback timing 764 while playback device 702 plays the first channel of the audio content 760 based on the playback timing 764.

In some embodiments, after playback device 704 and playback device 702 have been playing audio content 760 from audio source 708 for some period of time, a new audio source (audio source 718) may later be connected (not shown) to playback device 702 via network interface 722.

In some embodiments, after connecting the audio source 718 to playback device 702, playback device 702 and playback device 704 remain in the stereo pair configuration 730. But after connecting audio source 718 to playback device 702, and after audio source 718 begins streaming new audio content to playback device 702, some embodiments include playback device 702 exchanging one or more control signaling messages with playback device 704, thereby causing playback device 704 to facilitate transitioning the stereo pair primary role (and also perhaps the group coordinator role) from playback device 704 to playback device 702.

After connecting audio source 718 to playback device 702 and transitioning the stereo pair primary role (and also perhaps the group coordinator role) from playback device 704 to playback device 702, the stereo pair configuration 730 ceases playback of the audio content 760 from audio source 708, and playback device 702 (as the new stereo pair primary) (i) processes new audio (not shown) from audio source 718, (ii) generates new processed audio content and new playback timing, (iii) transmits the new processed audio content and the new playback timing to playback device 704, and (iv) plays the new audio content in a groupwise manner with playback device 704. In some embodiments, playing the new audio content in a groupwise manner with playback device 704 includes (i) playback device 702 playing the first channel of the new audio content in synchrony with playback device 704 playing the second channel of the new audio content, and (ii) playback device 704 playing the second channel of the new audio content in synchrony with playback device 702 playing the first channel of the new audio content.

To help distinguish between times during which playback device 702 is functioning as the stereo pair primary for the stereo pair configuration 730 (and sourcing audio content for stereo playback by the stereo pair configuration 730) and times during which playback device 704 is functioning the stereo pair primary for the stereo pair configuration 730 (and sourcing the audio content for playback), some embodiments include the playback device currently operating as the stereo pair primary indicating that it is the stereo pair primary for the stereo pair configuration 730.

For example, in some embodiments, each playback device 702, 704 includes a light that, when illuminated (or perhaps illuminated a particular color), indicates that the playback device is currently acting as the stereo pair primary for the stereo pair configuration 730, and thus, sourcing the audio for the stereo pair configuration 730. In particular, when playback device 702 is acting as the stereo pair primary and sourcing the audio for playback by the stereo pair configuration 730, playback device 702 indicates, via the light, that it is acting as the stereo pair primary. Similarly, when playback device 704 is acting as the stereo pair primary and sourcing the audio for playback by the stereo pair configuration 730, playback device 704 indicates, via the light, that it is acting as the stereo pair primary.

In some embodiments where playback device 704 is connected to audio source 708 at the same time that playback device 702 is connected to audio source 718 described above, the stereo pair configuration 730 can selectively play audio content 760 from audio source 708 or the audio from audio source 718.

For example, in some embodiments where audio source 708 is a first smartphone (or other computing device) connected to playback device 704 via a Bluetooth connection and audio source 718 is a second smartphone (or other computing device) connected to playback device 702 via Bluetooth, both the first smartphone and the second smartphone can control the stereo pair configuration 730. In this instance, both the first smartphone and the second smartphone can send control messages to control track playback (e.g., play, pause, skip, fast-forward, rewind) and volume (e.g., volume up, volume, mute) regardless of which of the first smartphone or the second smartphone is providing audio for playback by the stereo pair configuration 730. But when playback device 704 is receiving audio from audio source 708 for playback by the stereo pair configuration 730, playback device 704 functions as the stereo pair primary for the stereo pair configuration 730. And when playback device 702 is receiving audio from audio source 718 for playback by the stereo pair configuration 730, playback device 702 functions as a stereo pair primary for the stereo pair configuration 730.

Embodiments where the playback device that receives the audio for playback by the stereo pair configuration 730 functions as the stereo pair primary are able to operate more efficiently and flexibly than embodiments where the stereo pair primary is set once for the stereo pair configuration 730 and remains fixed for the duration of the stereo pair configuration 730.

For example, if playback device 702 functions as the stereo pair primary while playback device 704 is sourcing audio content 760 from audio source 708, then playback device 704 would need to send the audio content 760 to playback device 702. Then, playback device 702 would process the audio content 760 received from playback device 704 to (i) generate the processed audio content 762 and playback timing 764 and (ii) transmit the processed audio content 762 and playback timing 764 to playback device 704. A scenario where playback device 704 transmits the audio content 760 to playback device 702 so that playback device 702 can process the audio content 760 and transmit the processed audio content 762 and playback timing 764 back to playback device 704 requires nearly twice as many transmissions and consumes nearly twice as much bandwidth on the PAN 720 as compared to a scenario where the stereo pair primary role switches between playback device 702 and playback device 704 depending on which of the playback devices 702, 704 is sourcing audio for playback by the stereo pair configuration 730.

VII. Example Methods

Figure 8A:
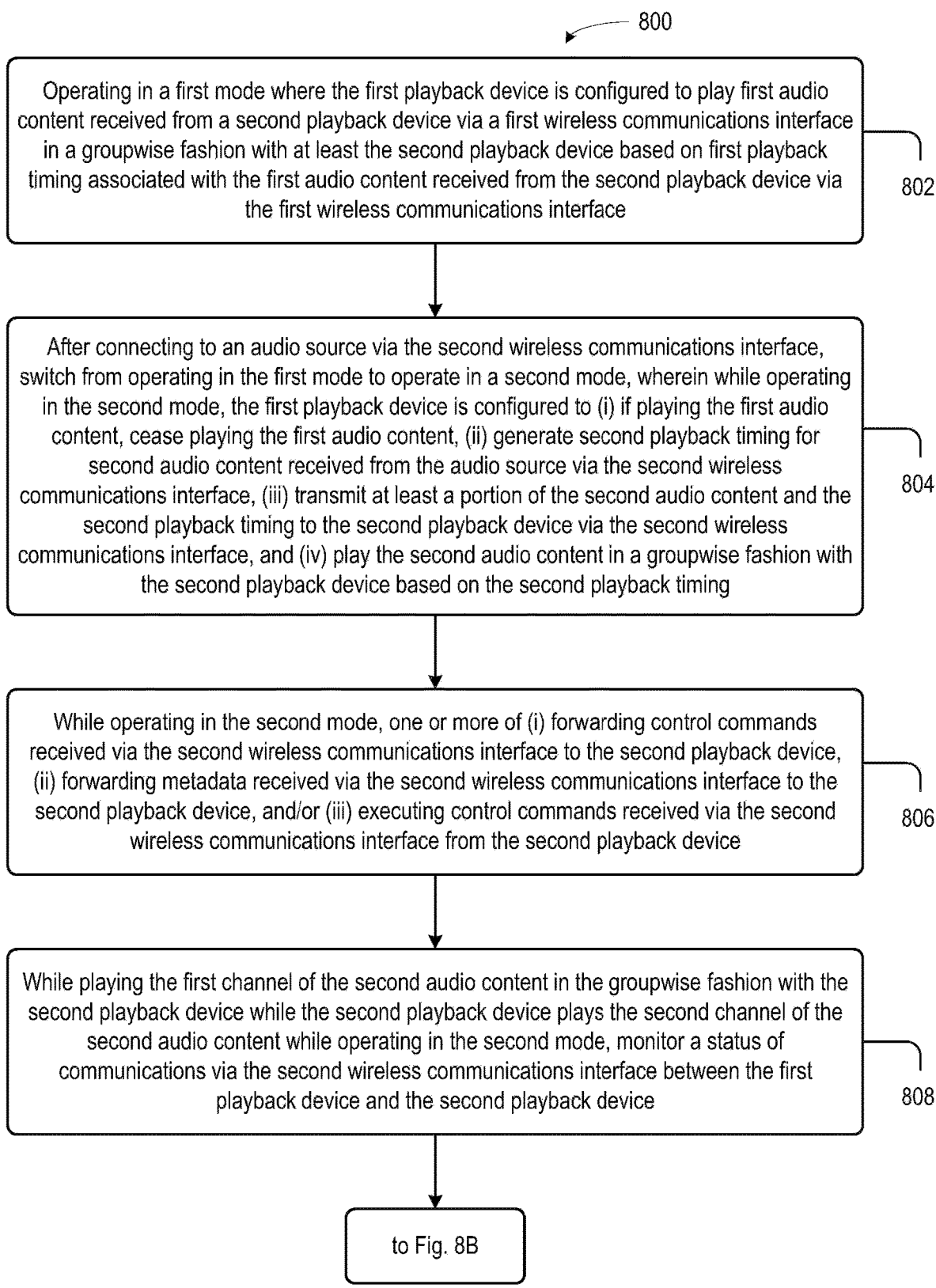
FIG. 8A shows aspects of a method of operating a playback device according to some embodiments.
Figure 8B:
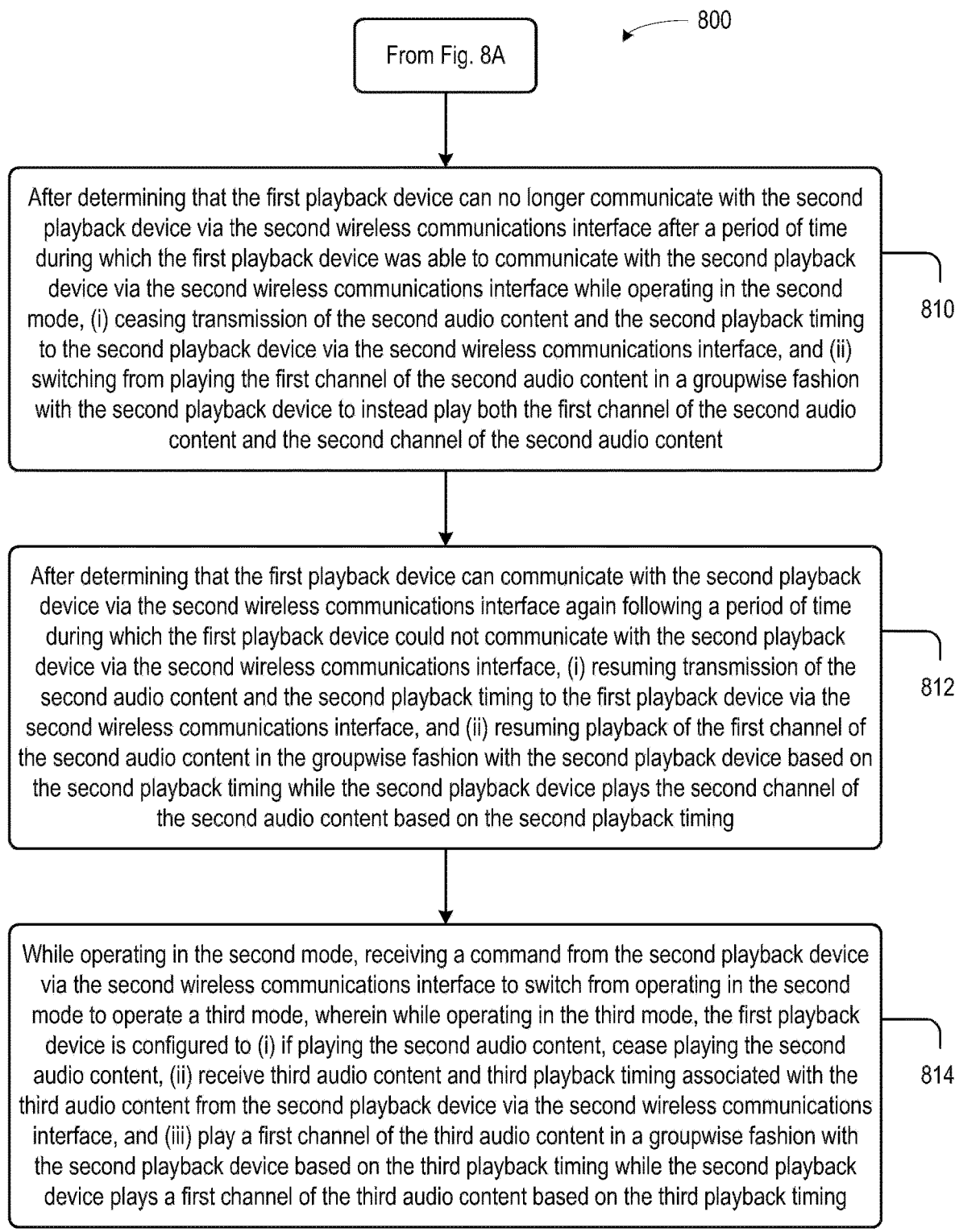
FIG. 8B shows further aspects of a method of operating a playback device according to some embodiments.

FIGS. 8A and 8B show several aspects of a method 800 of operating a playback device according to some embodiments.

One or more (or all) aspects of method 800 can be implemented by any of the playback devices disclosed and described herein, including but not limited to playback devices 702 and 704 shown and described with reference to FIGS. 7A and 7B.

Method 800 begins at method block 802, which includes a first playback device operating in a first mode. While operating in the first mode, the first playback device is configured to play first audio content received from a second playback device via a first wireless communications interface in a groupwise fashion with at least the second playback device based on first playback timing associated with the first audio content received from the second playback device via the first wireless communications interface. In some embodiments, rather than receiving the first audio content from the second playback device, the first playback device may instead receive the first audio content from some other computing device. In some embodiments, the first wireless interface comprises a WiFi interface. However, in other embodiments, the first wireless interface may comprise any other type of wireless interface now known or later developed.

In some embodiments, the first audio content comprises first stereo content, and the first playback device playing the first audio content received from the second playback device (or some other computing device) via the first wireless communications interface in the groupwise fashion with at least the second playback device includes the first playback device and the second playback device playing the first audio content in a stereo pair configuration whereby the first playback device plays one channel of the first stereo content and the second playback device plays the other channel of the first stereo content.

Next, method 800 advances to method block 804, which includes after connecting to an audio source via a second wireless communications interface, the first playback device switching from operating in the first mode to operating in a second mode. While operating in the second mode, the first playback device is configured to (i) if playing the first audio content, cease playing the first audio content, (ii) generate second playback timing for second audio content received from the audio source via the second wireless communications interface, (iii) transmit at least a portion of the second audio content and the second playback timing to the second playback device via the second wireless communications interface, and (iv) play the second audio content in a groupwise fashion with the second playback device based on the second playback timing. In some embodiments, the second wireless interface comprises a Bluetooth interface. However, in other embodiments, the second wireless interface may comprise any other type of wireless interface now known or later developed that is different than the first wireless interface. In some embodiments, rather than transmitting the at least a portion of the second audio content and the second playback timing to the second playback device via the second wireless communications interface, the first playback device instead transmits the at least a portion of the second audio content and the second playback timing to the second playback device via the first wireless communications interface.

In some embodiments, the second audio content comprises second stereo content, and the first playback device playing the second audio content in a groupwise fashion with the second playback device based on the second playback timing includes the first playback device and the second playback device playing the second audio content in a stereo pair configuration whereby the first playback device plays one channel of the second stereo content and the second playback device plays the other channel of the second stereo content.

In some embodiments where operating in the first mode comprises the first playback device and the second playback device playing the first audio content in a groupwise fashion in a playback group comprising the first playback device, the second playback and at least a third playback device, the block 804 function of switching from operating in the first mode to operating in the second mode includes the first playback device (i) leaving the playback group, and (ii) operating in a stereo pair with the second playback device, where while operating in the stereo pair, the first playback device is configured to play a first channel of the second audio content in a groupwise fashion with the second playback device based on the second playback timing while the second playback device plays a second channel of the second audio content based on the second playback timing.

Next method 800 advances to method block 806, which includes, while operating in the second mode, the first playback device one or more of (i) forwarding control commands received via the second wireless communications interface to the second playback device, (ii) forwarding metadata received via the second wireless communications interface to the second playback device, and/or (iii) executing control commands received via the second wireless communications interface from the second playback device. In some embodiments, the first playback device is configured to use the second wireless interface to perform the block 806 step of forwarding control commands received via the second wireless communications interface to the second playback device. Similarly, in some embodiments, the first playback device is configured to use the second wireless interface to perform the block 806 step of forwarding the metadata received via the second wireless communications interface to the second playback device. In some alternative embodiments, the first playback device is configured to use the first wireless communications interface instead of the second wireless communications interface to perform the block 806 step of forwarding control commands received via the second wireless communications interface to the second playback device. Similarly, in some alternative embodiments, the first playback device is configured to use the first wireless communications interface rather than the second wireless communications interface to perform the block 806 step of forwarding the metadata received via the second wireless communications interface to the second playback device.

Next, method 800 advances to method block 808, which includes, while playing the first channel of the second audio content in the groupwise fashion with the second playback device while the second playback device plays the second channel of the second audio content, the first playback device monitoring a status of communications via the second wireless communications interface between the first playback device and the second playback device. Monitoring the status of communications between the first playback device and the second playback device via the second wireless communications interface includes, but is not limited to, monitoring the transmission signal quality, signal-to-noise ratio, transmission errors, transmission error rates, bit errors, frame errors, signal receive power, ACK/NACK, dropped frames, dropped packets, forward error correction activity, and/or any other aspect of the communications between the first and second playback devices to determine whether and the extent to which the first playback device can (or cannot) reliably exchange communications with the second playback device via the second wireless communications interface.

Next, method 800 advances to method block 810, which includes after determining that the first playback device can no longer communicate with (or no longer reliably communicate with) the second playback device via the second wireless communications interface after a period of time during which the first playback device was able to communicate with the second playback device via the second wireless communications interface, the first playback device (i) ceasing transmission of the second audio content and the second playback timing to the second playback device via the second wireless communications interface, and (ii) switching from playing the first channel of the second audio content in a groupwise fashion with the second playback device to instead play both the first channel of the second audio content and the second channel of the second audio content.

Next, method 800 advances to method block 812, which includes after determining that the first playback device can communicate with the second playback device via the second wireless communications interface again following a period of time during which the first playback device could not communicate with (or reliably communicate with) the second playback device via the second wireless communications interface, the first playback device (i) resuming transmission of the second audio content and the second playback timing to the first playback device via the second wireless communications interface, and (ii) resuming playback of the first channel of the second audio content in the groupwise fashion with the second playback device based on the second playback timing while the second playback device plays the second channel of the second audio content based on the second playback timing.

Next, method 800 advances to method block 814, which includes while operating in the second mode, the first playback device receiving a command from the second playback device via the second wireless communications interface to switch from operating in the second mode to operate a third mode. While operating in the third mode, the first playback device is configured to (i) if playing the second audio content, cease playing the second audio content, (ii) receive third audio content and third playback timing associated with the third audio content from the second playback device via the second wireless communications interface, and (iii) play a first channel of the third audio content in a groupwise fashion with the second playback device based on the third playback timing while the second playback device plays a first channel of the third audio content based on the third playback timing.

Some embodiments of method 800 further include the first playback device operating a light configured to provide a first indication when the first playback device is operating in the first mode, provide a second indication when the first playback device is operating in the second mode, and provide a third indication when the first playback device is operating in the third mode. In some embodiments, the first indication corresponds to a first color, the second indication corresponds to a second color, and the third indication corresponds to a third color. In other embodiments, the first indication corresponds to a first flashing pattern, the second indication corresponds to a second flashing pattern and the third indication corresponds to a third flashing pattern.

Further embodiments of method 800 include the first playback device operating a light or other indicator that indicates times during which the first playback device is receiving audio content from an audio source and providing the audio content to the second playback device for playback in a groupwise fashion with the first playback device.

VIII. Conclusions

The above discussions relating to playback devices, controller devices, playback zone configurations, and media/audio content sources provide only some examples of operating environments within which functions and methods described below may be implemented. Other operating environments and configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

What is claimed is:

1. A first playback device comprising:
   one or more processors;
   a first wireless communications interface;
   a second wireless communications interface; and
   tangible, non-transitory computer-readable media comprising program instructions executable by the one or more processors such that the first playback device is configured to:
   operate in a first mode, wherein while operating in the first mode, the first playback device is configured to play first audio content received from a second playback device via the first wireless communications interface in a groupwise fashion with at least the second playback device based on first playback timing associated with the first audio content received from the second playback device via the first wireless communications interface; and
   after connecting to an audio source via the second wireless communications interface, switch from operating in the first mode to operate in a second mode, wherein while operating in the second mode, the first playback device is configured to (i) if playing the first audio content, cease playing the first audio content, (ii) generate second playback timing for second audio content received from the audio source via the second wireless communications interface, (iii) transmit at least a portion of the second audio content and the second playback timing to the second playback device via the second wireless communications interface, and (iv) play the second audio content in a groupwise fashion with the second playback device based on the second playback timing.

2. The first playback device of claim 1, wherein the program instructions executable by the one or more processors such that the first playback device is configured to play the second audio content in a groupwise fashion with the second playback device based on the second playback timing comprise program instructions executable by the one or more processors such that the first playback device is configured to play a first channel of the second audio content in a groupwise fashion with the second playback device based on the second playback timing while the second playback device plays a second channel of the second audio content based on the second playback timing.

3. The first playback device of claim 2, wherein the program instructions executable by the one or more processors such that the first playback device is configured to operate in a first mode comprise program instructions executable by the one or more processors such that the first playback device is configured to:

while playing the first channel of the second audio content in the groupwise fashion with the second playback device while the second playback device plays the second channel of the second audio content, monitor a status of communications via the second wireless communications interface between the first playback device and the second playback device; and after determining that the first playback device can no longer communicate with the second playback device via the second wireless communications interface after a period of time during which the first playback device was able to communicate with the second playback device via the second wireless communications interface, (i) cease transmission of the second audio content and the second playback timing to the second playback device via the second wireless communications interface, and (ii) switch from playing the first channel of the second audio content in a groupwise fashion with the second playback device to instead play both the first channel of the second audio content and the second channel of the second audio content.

4. The first playback device of claim 3, wherein the program instructions executable by the one or more processors such that the first playback device is configured to operate in a second mode comprise program instructions executable by the one or more processors such that the first playback device is configured to:

after determining that the first playback device can communicate with the second playback device via the second wireless communications interface again following a period of time during which the first playback device could not communicate with the second playback device via the second wireless communications interface, (i) resume transmission of the second audio content and the second playback timing to the first playback device via the second wireless communications interface, and (ii) resume playback of the first channel of the second audio content in the groupwise fashion with the second playback device based on the second playback timing while the second playback device plays the second channel of the second audio content based on the second playback timing.

5. The first playback device of claim 1, wherein the program instructions executable by the one or more processors such that the first playback device is configured to operate in a second mode comprise program instructions executable by the one or more processors such that the first playback device is configured to (i) forward control commands received via the second wireless communications interface to the second playback device, (ii) forward metadata received via the second wireless communications interface to the second playback device, and (iii) execute control commands received via the second wireless communications interface from the second playback device.

6. The first playback device of claim 5, wherein the program instructions executable by the one or more processors such that the first playback device is configured to operate in a second mode comprise program instructions executable by the one or more processors such that the first playback device is configured to use the second wireless communications interface to forward (i) the control commands received via the second wireless communications interface to the second playback device and (ii) the metadata received via the second wireless communications interface to the second playback device.

7. The first playback device of claim 1, wherein operating in the first mode comprises the first playback device and the second playback device playing the first audio content in a groupwise fashion in a playback group comprising the first playback device, the second playback device, and at least a third playback device, and wherein the program instructions executable by the one or more processors such that the first playback device is configured to switch from operating in the first mode to operate in the second mode comprise program instructions executable by the one or more processors such that the first playback device is configured to:

leave the playback group; and operate in a stereo pair with the second playback device, wherein while operating in the stereo pair, the first playback device is configured to play a first channel of the second audio content in a groupwise fashion with the second playback device based on the second playback timing while the second playback device plays a second channel of the second audio content based on the second playback timing.

8. The first playback device of claim 1, wherein the program instructions comprise further program instructions executable by the one or more processors such that the first playback device is configured to:

while operating in the second mode, receive a command from the second playback device via the second wireless communications interface to switch from operating in the second mode to operate a third mode, wherein while operating in the third mode, the first playback device is configured to (i) if playing the second audio content, cease playing the second audio content, (ii) receive third audio content and third playback timing associated with the third audio content from the second playback device via the second wireless communications interface, and (iii) play a first channel of the third audio content in a groupwise fashion with the second playback device based on the third playback timing while the second playback device plays a first channel of the third audio content based on the third playback timing.

9. The first playback device of claim 8, further comprising a light configured to provide a first indication when the first playback device is operating in the first mode, provide a second indication when the first playback device is operating in the second mode, and provide a third indication when the first playback device is operating in the third mode.

10. The first playback device of claim 1, wherein the first wireless communications interface comprises a WiFi interface, and wherein the second wireless communications interface comprises a Bluetooth interface.

11. A system comprising a first playback device and a second playback device, wherein the first playback device comprises:

one or more first processors;

a first wireless local area network (WLAN) interface;

a first wireless personal area network (WPAN) interface; and first tangible, non-transitory computer-readable media comprising first program instructions executable by the one or more first processors such that the first playback device is configured to:

operate in a first mode, wherein while operating in the first mode, the first playback device is configured to play first audio content received from the second playback device via the first WLAN interface in a groupwise fashion with at least the second playback device based on first playback timing associated with the first audio content received from the second playback device via the first WLAN interface; and after connecting to a first audio source via the first WPAN interface, switch from operating in the first mode to operate in a second mode, wherein while operating in the second mode, the first playback device is configured to (i) if playing the first audio content, cease playing the first audio content, (ii) generate second playback timing for second audio content received from the first audio source via the first WPAN interface, (iii) transmit at least a portion of the second audio content and the second playback timing to the second playback device via the first WPAN interface, and (iv) play the second audio content in a groupwise fashion with the second playback device based on the second playback timing.

12. The system of claim 11, wherein the first program instructions executable by the one or more first processors such that the first playback device is configured to play the second audio content in a groupwise fashion with the second playback device based on the second playback timing comprise program instructions executable by the one or more first processors such that the first playback device is configured to play a first channel of the second audio content in a groupwise fashion with the second playback device based on the second playback timing while the second playback device plays a second channel of the second audio content based on the second playback timing.

13. The system of claim 12, wherein while operating in the second mode, the first playback device is configured to:
while playing the first channel of the second audio content in the groupwise fashion with the second playback device while the second playback device plays the second channel of the second audio content, monitor a status of communications via the first WPAN interface between the first playback device and the second playback device; and
after determining that the first playback device can no longer communicate with the second playback device via the first WPAN interface after a period of time during which the first playback device was able to communicate with the second playback device via the first WPAN interface, (i) cease transmission of the second audio content and the second playback timing to the first playback device via the first WPAN interface, and (ii) switch from playing the first channel of the second audio content in a groupwise fashion with the second playback device to instead play both the first channel of the second audio content and the second channel of the second audio content.

14. The system of claim 13, wherein while operating in the second mode, the first playback device is configured to:
after determining that the first playback device can communicate with the second playback device via the first WPAN interface again following a period of time during which the first playback device could not communicate with the second playback device via the first WPAN interface, (i) resume transmission of the second audio content and the second playback timing to the first playback device via the first WPAN interface, and (ii) resume playback of the first channel of the second audio content in the groupwise fashion with the second playback device based on the second playback timing while the second playback device plays the second channel of the second audio content based on the second playback timing.

15. The system of claim 11, wherein while operating in the second mode, the first playback device is configured to (i) forward control commands received via the first WPAN interface to the second playback device, (ii) forward metadata received via the first WPAN interface to the second playback device, and (iii) execute control commands received via the first WPAN interface from the second playback device.

16. The system of claim 11, wherein the first playback device operating in the first mode comprises the first playback device and the second playback device playing the first audio content in a groupwise fashion in a playback group comprising the first playback device, the second playback and at least a third playback device, and wherein the first program instructions executable by the one or more first processors such that the first playback device is configured to switch from operating in the first mode to operate in the second mode comprise program instructions executable by the one or more first processors such that the first playback device is configured to:
leave the playback group; and
operate in a stereo pair with the second playback device, wherein while operating in the stereo pair, the first playback device is configured to play a first channel of the second audio content in a groupwise fashion with the second playback device based on the second playback timing while the second playback device plays a second channel of the second audio content based on the second playback timing.

17. The system of claim 11, wherein the first program instructions comprise further program instructions executable by the one or more first processors such that the first playback device is configured to:
while operating the second mode, receive a command from the second playback device via the first WPAN interface to switch from operating in the second mode to operate a third mode, wherein while operating in the third mode, the first playback device is configured to (i) if playing the second audio content, cease playing the second audio content, (ii) receive third audio content and third playback timing associated with the third audio content from the second playback device via the first WPAN interface, and (iii) play a first channel of the third audio content in a groupwise fashion with the second playback device based on the third playback timing while the second playback device plays a first channel of the third audio content based on the third playback timing.

18. The system of claim 11, wherein the second playback device comprises:
one or more second processors;
a second wireless local area network (WLAN) interface;
a second wireless personal area network (WPAN) interface; and
second tangible, non-transitory computer-readable media comprising second program instructions executable by the one or more second processors such that the second playback device is configured to:
operate in a fourth mode, wherein while operating in the fourth mode, the second playback device is configured to (i) transmit the first audio content and the first playback timing associated with the first audio content to the first playback device via the second WLAN interface, and (ii) play the first audio content in a groupwise fashion with at least the first playback device based on the first playback timing; and
after receiving an indication from the first playback device that the first playback device has connected to the first audio source via the first WPAN interface, switch from operating in the fourth mode to operate in a fifth mode, wherein while operating in the fifth mode, the second playback device is configured to (i) if playing the first audio content, cease playing the first audio content, (ii) receive the second audio content and the second playback timing from the first playback device via the second WPAN interface, and (iii) play a second channel of the second audio content in a groupwise fashion with the first playback device based on the second playback timing while the first playback device plays a first channel of the second audio content based on the second playback timing.

19. The system of claim 18, wherein while operating in the fifth mode, the second playback device is configured to (i) cause the first playback device and the second playback device to execute control commands received via the second WPAN interface from the second playback device, and (ii) forward metadata received via the second WPAN interface from the second playback device to one or more controller devices configured to control the first playback device and the second playback device.

20. The system of claim 18, wherein the second program instructions comprise program instructions executable by the one or more second processors such that the second playback device is configured to:

after connecting to a second audio source via the second WPAN interface, switch from operating in the fifth mode to operate in a sixth mode, wherein while operating in the sixth mode, the second playback device is configured to (i) if playing the second audio content, cease playing the second audio content, (ii) generate fourth playback timing for fourth audio content received from the second audio source via the second WPAN interface, (iii) transmit at least a portion of the fourth audio content and the fourth playback timing to the first playback device via the second WPAN interface, and (iv) play a second channel of the fourth audio content in a groupwise fashion with the first playback device based on the fourth playback timing while the first playback device plays a first channel of the fourth audio content based on the fourth playback timing.

\* \* \* \* \*